(12) United States Patent
Zheng et al.

(10) Patent No.: US 12,100,819 B2
(45) Date of Patent: Sep. 24, 2024

(54) SWITCH CONTROL DEVICE AND METHOD, MOTOR CONTROLLER, AND BATTERY PACK HEATING CONTROL SYSTEM

(71) Applicant: Contemporary Amperex Technology Co., Limited, Ningde (CN)

(72) Inventors: Xiong Zheng, Ningde (CN); Zhimin Dan, Ningde (CN); Xiyang Zuo, Ningde (CN); Bao Li, Ningde (CN); Tiancong Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 586 days.

(21) Appl. No.: 17/390,879

(22) Filed: Jul. 31, 2021

(65) Prior Publication Data

US 2021/0359348 A1 Nov. 18, 2021

Related U.S. Application Data

(63) Continuation of application No. PCT/CN2020/089663, filed on May 11, 2020.

(30) Foreign Application Priority Data

Jun. 24, 2019 (CN) .......................... 201910548124.6

(51) Int. Cl.
*H01M 10/44* (2006.01)
*B60L 3/00* (2019.01)
(Continued)

(52) U.S. Cl.
CPC ......... *H01M 10/443* (2013.01); *B60L 3/0046* (2013.01); *B60L 15/20* (2013.01);
(Continued)

(58) Field of Classification Search
CPC ............. H01M 10/443; H01M 10/441; H01M 10/615; H01M 10/625; H01M 10/633;
(Continued)

(56) References Cited

U.S. PATENT DOCUMENTS

2011/0251745 A1* 10/2011 Yamamoto ............ B60W 10/06
180/65.265
2013/0134945 A1* 5/2013 Xu .......................... B60L 50/40
320/136

FOREIGN PATENT DOCUMENTS

CN 103560304 A 2/2014
CN 104538701 A 4/2015
(Continued)

OTHER PUBLICATIONS

The International search report for PCT Application No. PCT/CN2020/089663, dated Jul. 13, 2020, 12 pages.
(Continued)

*Primary Examiner* — Lisa S Park
(74) *Attorney, Agent, or Firm* — East IP P.C.

(57) ABSTRACT

The present application provides a switch control device and method, a motor controller, and a battery pack heating control system. The switch control device includes: a processing module configured to select, when it is determined that a switch control cycle switches from a previous cycle to a current cycle, a target upper bridge arm switch module for the current cycle from upper bridge arm switch modules other than a target upper bridge arm switch module for the previous cycle and/or select a target lower bridge arm switch module for the current cycle from lower bridge arm switch modules other than a target lower bridge arm switch module for the previous cycle; wherein the processing module is further configured to: during each switch control cycle, control the target upper bridge arm switch module and the (Continued)

target lower bridge arm switch module to be turned on and off.

20 Claims, 5 Drawing Sheets

(51) Int. Cl.
*B60L 15/20* (2006.01)
*B60L 53/62* (2019.01)
*B60L 58/12* (2019.01)
*B60L 58/27* (2019.01)
*H01M 10/615* (2014.01)
*H01M 10/625* (2014.01)
*H01M 10/633* (2014.01)
*H02J 7/00* (2006.01)
*H02P 29/68* (2016.01)

(52) U.S. Cl.
CPC ............... *B60L 53/62* (2019.02); *B60L 58/12* (2019.02); *B60L 58/27* (2019.02); *H01M 10/441* (2013.01); *H01M 10/615* (2015.04); *H01M 10/625* (2015.04); *H01M 10/633* (2015.04); *H02J 7/0068* (2013.01); *H02P 29/68* (2016.02); *H01M 2220/20* (2013.01)

(58) Field of Classification Search
CPC .. H01M 2220/20; B60L 3/0046; B60L 15/20; B60L 53/62; B60L 58/12; B60L 58/27; H02J 7/0068; H02P 29/68; H02P 27/06; Y02E 60/10; Y02T 10/70; Y02T 10/7072; Y02T 10/72; Y02T 90/12
See application file for complete search history.

(56) References Cited

FOREIGN PATENT DOCUMENTS

| | | |
|---|---|---|
| CN | 103560304 B | 5/2016 |
| CN | 107666028 A | 2/2018 |
| CN | 108306078 A | 7/2018 |
| CN | 105762434 B | 12/2018 |
| CN | 109823234 A | 5/2019 |
| CN | 110970965 A | 4/2020 |
| JP | 2000228231 A | 8/2000 |
| JP | 2013187919 A | 9/2013 |
| JP | 2014072955 A | 4/2014 |
| JP | 2014146589 A | 8/2014 |
| JP | 5849917 B2 | 2/2016 |

OTHER PUBLICATIONS

The First Office Action for Chinese Application No. 201910548124.6, dated Jul. 27, 2020, 12 pages.
The Notification to Grant Patent Right for Invention for JP Application No. 2020-041326, dated Feb. 16, 2021, 5 pages.
The extended European search report for EP Application No. 20181389.6, dated Nov. 27, 2020, 7 pages.
The First Office Action for EP Application No. 20181389.6, dated Sep. 28, 2021, 5 pages.
The Second Office Action for European Application No. 20181389.6, dated Jun. 30, 2022, 4 pages.

* cited by examiner

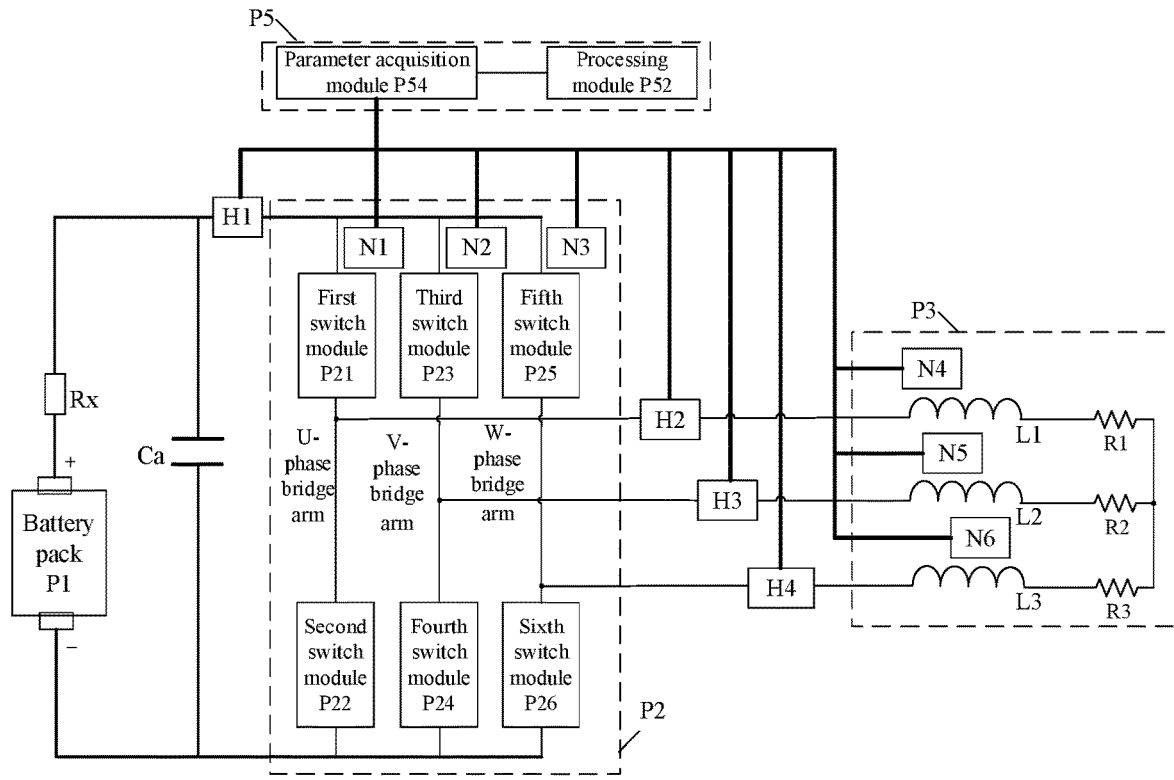

Fig. 7

When it is determined that a switch control cycle switches from a previous cycle to a current cycle, a target upper bridge arm switch module for the current cycle may be selected from upper bridge arm switch modules other than a target upper bridge arm switch module for the previous cycle in three-phase bridge arms, and/or a target lower bridge arm switch module for the current cycle may be selected from lower bridge arm switch modules other than a target lower bridge arm switch module for the previous cycle in the three-phase bridge arms — S801

During each switch control cycle, the target upper bridge arm switch module and the target lower bridge arm switch module may be controlled to be turned on and off — S802

Fig. 8

SWITCH CONTROL DEVICE AND METHOD, MOTOR CONTROLLER, AND BATTERY PACK HEATING CONTROL SYSTEM

CROSS REFERENCE TO RELATED APPLICATIONS

This application is a continuation of International Application No. PCT/CN2020/089663 filed on May 11, 2020, which claims priority to Chinese Patent Application No. 201910548124.6 filed on Jun. 24, 2019, all of which are hereby incorporated by reference in their entireties.

FIELD

The present application relates to the field of battery technology, and more particularly to a switch control device and method, a motor controller, and a battery pack heating control system.

BACKGROUND

With development of new energy, new energy is used as power in more and more fields. Due to advantages of high energy density, recyclable charging, safety and environmental friendliness and so on, batteries are widely used in new energy vehicles, consumer electronics, energy storage systems and other fields.

However, use of a battery in low temperature environment is subject to certain restrictions. Specifically, discharge capacity of the battery is degraded seriously in low temperature environment, and the battery cannot be charged in low temperature environment. Therefore, in order to be able to use the battery normally, it is necessary to heat the battery in low temperature environment.

At present, the battery can be internally heated by using an alternating current to excite electrochemical materials inside the battery. In the case that a switch module of an inverter in a battery heating system is periodically turned on to control periodical charging and discharging of an energy storage module of a motor in the battery heating system so as to generate the alternating current in a circuit where the battery pack is located to heat the battery pack, both the switch module in the inverter and the energy storage module in the motor are likely to be overheated due to generation of a large amount of heat. The overheating of these devices will affect the safety of the battery pack heating.

SUMMARY

Embodiments of the present application provide a switch control device and method, a motor controller, and a battery pack heating control system.

According to a first aspect, the embodiments of the present application provide a switch control device including: a processing module configured to: when it is determined that a switch control cycle switches from a previous cycle to a current cycle, select a target upper bridge arm switch module for the current cycle from upper bridge arm switch modules other than a target upper bridge arm switch module for the previous cycle in three-phase bridge arms, and/or select a target lower bridge arm switch module for the current cycle from lower bridge arm switch modules other than a target lower bridge arm switch module for the previous cycle in the three-phase bridge arms; the processing module is further configured to: during each switch control cycle, control the target upper bridge arm switch module and the target lower bridge arm switch module to be turned on and off, so as to control at least two phase energy storage modules in a motor of the battery pack heating system to store and release energy and thus realize heating of a battery pack; wherein the three-phase bridge arms are located in an inverter of the battery pack heating system, and the target upper bridge arm switch module and the target lower bridge arm switch module for a same switch control cycle are located in different phase bridge arms.

According to a second aspect, the embodiments of the present application provide a switch control method for a battery pack heating system. The switch control method includes selecting, when it is determined that a switch control cycle switches from a previous cycle to a current cycle, a target upper bridge arm switch module for the current cycle from upper bridge arm switch modules other than a target upper bridge arm switch module for the previous cycle in three-phase bridge arms and/or selecting a target lower bridge arm switch module for the current cycle from lower bridge arm switch modules other than a target lower bridge arm switch module for the previous cycle in the three-phase bridge arms; and controlling, during each switch control cycle, the target upper bridge arm switch module and the target lower bridge arm switch module to be turned on and off, so as to control at least two phase energy storage modules in a motor of the battery pack heating system to store and release energy and thus realize heating of a battery pack; wherein the three-phase bridge arms are located in an inverter of the battery pack heating system, and the target upper bridge arm switch module and the target lower bridge arm switch module for a same switch control cycle are located in different phase bridge arms.

According to a third aspect, the embodiments of the present application provide a motor controller including the switch control device for the battery pack heating system according to the first aspect.

According to a fourth aspect, the embodiments of the present application provide a battery pack heating control system including a battery pack heating system and the switch control device for the battery pack heating system according to the first aspect. The battery pack heating system includes an inverter connected to a battery pack and a motor connected to the inverter.

BRIEF DESCRIPTION OF THE DRAWINGS

To more clearly illustrate technical solutions of embodiments of the present application, the accompanying drawings, which are to be referred by the embodiments of the present application, will be briefly described. Those skilled in the art will be able to obtain additional drawings in accordance with these drawings without any creative work.

FIG. 7 is a schematic structural diagram of a switch control device of an exemplary battery pack heating system according to a second embodiment of the present application;

FIG. 8 is a flow chart of a switch control method of a battery pack heating system in an embodiment of the present application.

DETAILED DESCRIPTION

Figure 1:
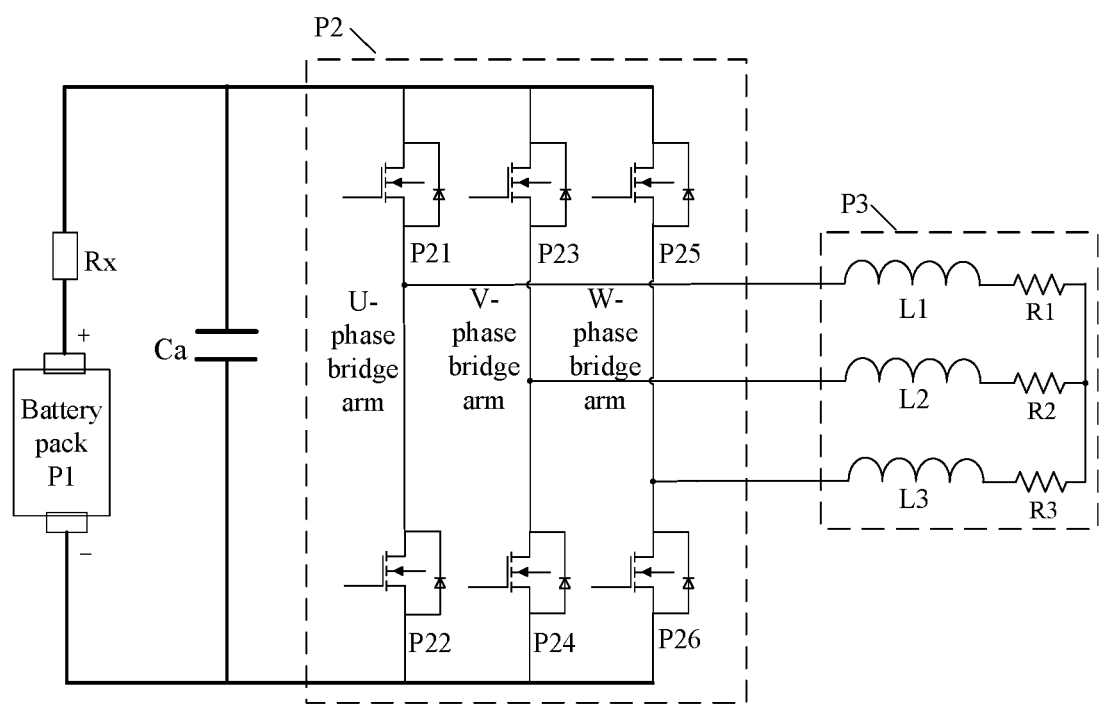
FIG. 1 is a schematic structural diagram of a battery pack heating system according to a first embodiment of the present application.

Various aspects of features and exemplary embodiments of the present application will be described in detail below. A number of specific details are presented in the following detailed description to provide a comprehensive understanding of the present application. However, it will be apparent to those skilled in the art that the present application may be practiced without some of these specific details. The following description of the embodiments is merely to provide a better understanding of the present application by illustrating examples thereof. The present application is by no means limited to any specific configuration and algorithm set forth below, but covers any modification, replacement and improvement of elements, components and algorithms without departing from the present application. Well-known structures and techniques are not shown in the drawings and the following description, so as to avoid unnecessary ambiguity of the present application.

The embodiments of the present application provide a switch control device and method, a motor controller, and a battery pack heating control system, which may be applied in a specific scene where the battery pack may be heated when a temperature of the battery pack is low so that the temperature of the battery pack can rise to a temperature at which the battery pack may be normally used. The battery pack may include at least one battery unit or at least one battery unit, which is not limited herein. The battery pack may be applied to an electric vehicle to supply power to a motor as a power source for the electric vehicle. The battery pack may also supply power to other power consumption devices in the electric vehicle, such as an in-car air conditioner, an on-board player, and the like. In the embodiments of the present application, by controlling the switch module in the inverter of the battery pack heating system, the switch module can be prevented from being overheated due to long-time conduction, thereby improving the safety of the battery pack heating.

FIG. 1 is a schematic structural diagram of a battery pack heating system according to a first embodiment of the present application. As shown in FIG. 1, the battery pack heating system includes: an inverter P2 connected to a battery pack P1 and a motor P3 connected to the inverter P2.

The inverter P2 includes three-phase bridge arms connected in parallel. Each phase bridge arm of the three-phase bridge arms includes an upper bridge arm and a lower bridge arm. Each upper bridge arm is provided with a switch module, and each lower bridge arm is provided with a switch module.

For example, referring to FIG. 1, the three-phase bridge arms may include a U-phase bridge arm, a V-phase bridge arm, and a W-phase bridge arm. The switch module at the upper bridge arm of the U-phase bridge arm is a first switch module P21, and the switch module at the lower bridge arm of the U-phase bridge arm is a second switch module P22. The switch module at the upper bridge arm of the V-phase bridge arm is a third switch module P23, and the switch module at the lower bridge arm of the V-phase bridge arm is a fourth switch module P24. The switch module at the upper bridge arm of the W-phase bridge arm is a fifth switch module P25, and the switch module at the lower bridge arm of the W-phase bridge arm is a sixth switch module P26.

The motor P3 includes three-phase energy storage modules respectively corresponding to the three-phase bridge arms. The three-phase energy storage modules are connected to each other at one end thereof, and the other end of each of the three-phase energy storage modules is respectively connected to a connection point of an upper bridge arm and a lower bridge arm of a corresponding bridge arm. In some examples, the three-phase energy storage modules can be stator inductors.

For example, with continued reference to FIG. 1, a U-phase stator inductor L1 corresponds to the U-phase bridge arm, a V-phase stator inductor L2 corresponds to the V-phase bridge arm, and a W-phase stator inductor L3 corresponds to the W-phase bridge arm. The U-phase stator inductor L1, the V-phase stator inductor L2, and the W-phase stator inductor L3 are connected to each other at one end thereof.

For a connection relationship between each phase energy storage module and each bridge arm, taking the U-phase stator inductor L1 as an example, the other end of the U-phase stator inductor L1 is connected to the connection point of the upper-bridge-arm switch module P21 and the lower-bridge-arm switch module P22 of the U-phase bridge arm.

In some embodiments of the present application, the battery pack heating system further includes a support capacitor Ca in parallel with respective phase bridge arms of the inverter P2. One end of the support capacitor Ca is connected to the positive electrode of the battery pack P1, and the other end is connected to the negative electrode of the battery pack P2. The support capacitor Ca is used to absorb a high ripple voltage or current that may be generated when the switch module of the inverter P2 is turned off, so that voltage and current fluctuations in the battery pack heating system can be kept within an allowable range, thereby avoiding voltage and current overshoot.

In some embodiments of the present application, the motor P3 further includes resistor modules respectively connected to the three-phase energy storage modules. Specifically, the three-phase energy storage modules are connected to each other at one end thereof via a corresponding resistor module. The resistor module may include a single resistor or a plurality of resistors connected in parallel, in series, or in series-parallel connection, which is not limited herein.

For example, with continued reference to FIG. 1, one end of the U-phase stator inductor L1 is connected to one end of the resistor module R1, one end of the V-phase stator inductor L2 is connected to one end of the resistor module R2, and one end of the W-phase stator inductor L3 is connected to one end of the resistor module R3. The other end of the resistor module R1 and the other end of the resistor module R2 are connected to the other end of the resistor module R3.

The battery pack heating system of the embodiments of the application can charge or discharge the battery pack P1 based on the control of the motor controller. Specifically, the motor controller can control, via a periodic driving signal, a target upper bridge arm switch module and a target lower bridge arm switch module in the switch module of the inverter to be periodically turned on and off, so that the energy storage module can periodically store and release power and thus periodically charge and discharge the battery pack P1. For example, when the driving signal outputted by the motor controller is at a high level, the target upper bridge arm switch module and the target lower bridge arm switch module are turned on, and the energy storage module is charged; when the driving signal outputted by the motor controller is at a low level, the target upper bridge arm switch module and the target lower bridge arm switch module are turned off, and the energy storage module is discharged.

In some embodiments of the application, the target upper bridge arm switch module is any of upper bridge arm switch modules of the three-phase bridge arms, and the target lower bridge arm switch module is any of lower bridge arm switch modules of the bridge arms other than the first target bridge arm among the three-phase bridge arms.

In some examples, switch modules may include one or more of power switching devices, such as an Insulated Gate Bipolar Transistor (Insulated Gate Bipolar Transistor, IGBT) chip, an IGBT module, a Metal-Oxide-Semiconductor Field-Effect Transistor (Metal-Oxide-Semiconductor Field-Effect Transistor, MOSFET) and the like. Here, a combination manner and a connection manner of each IGBT device, each MOSFET device and the like in the switch module are not limited. The material type of the power switching devices described above is also not limited. For example, a power switching device made of silicon carbide (SiC) or other materials may be used. It is worth mentioning that the power switching devices described above have a diode. Specifically, the diode may be a parasitic diode or a specially configured diode. The material type of the diode is also not limited, and for example, a diode made of silicon (Si), silicon carbide (SiC), or other materials may be used.

For convenience of description, the following two examples in which, for example, the target upper bridge arm switch module is P21 and the target lower bridge arm switch module is P24 are provided to illustrate a specific discharging process and a specific charging process of the battery pack P1 by the battery pack heating system.

Figure 2:
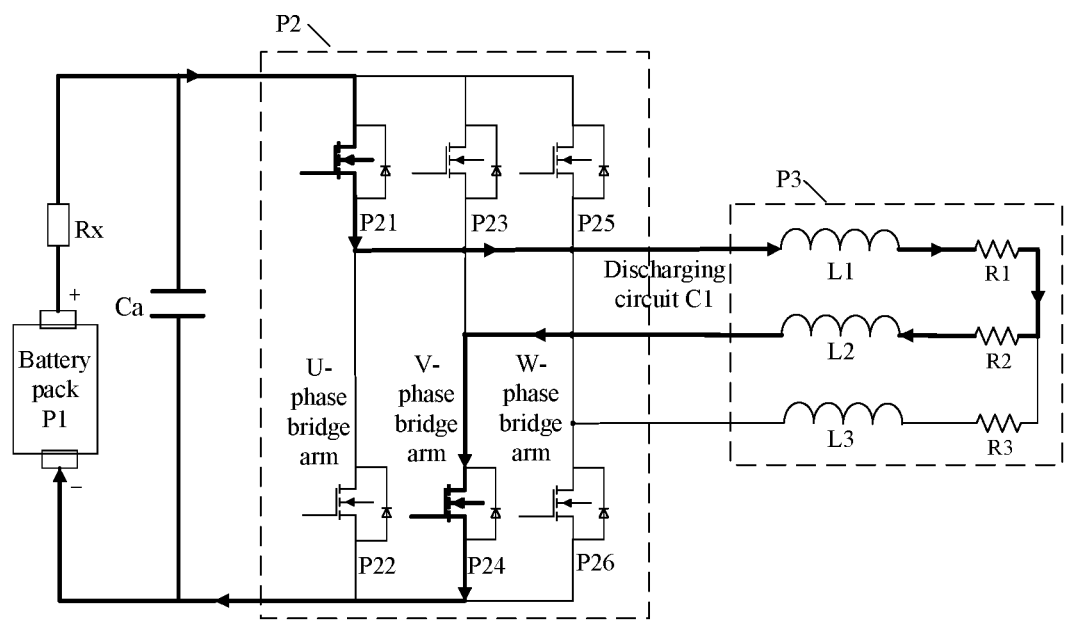
FIG. 2 shows a schematic diagram of an exemplary battery pack discharging circuit in an embodiment of the present application.

As a first example, FIG. 2 shows a schematic diagram of an exemplary battery pack discharging circuit in an embodiment of the present application. As shown in FIG. 2, when the motor controller controls the target upper bridge arm switch module P21 and the target lower bridge arm switch module P24 to be in an ON state, according to the direction of current flow, the discharging circuit C1 of the battery pack P1 includes: a positive electrode of the battery pack P1→the target upper bridge arm switch module P21→a U-phase stator inductor L1→a resistor module R1→a resistor module R2→a V-phase stator inductor L2→the target lower bridge arm switch module P24→a negative electrode of the battery pack P1.

During the discharging process of the battery pack P1, the U-phase stator inductor L1 and the V-phase stator inductor L2 store energy.

Figure 3:
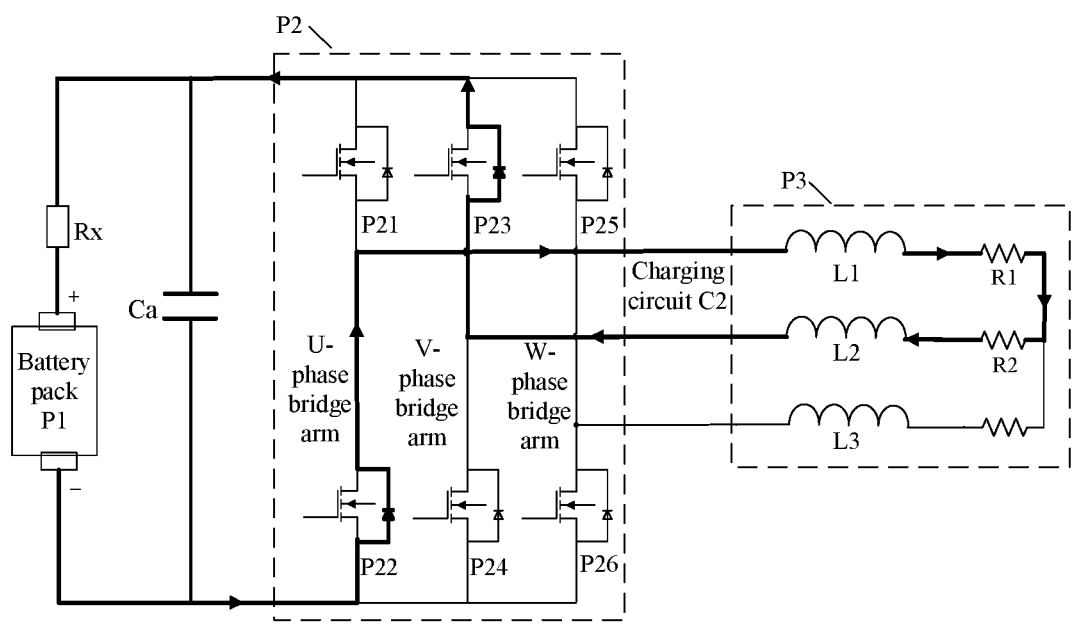
FIG. 3 shows a schematic diagram of an exemplary battery pack charging circuit in an embodiment of the present application.

As a second example, FIG. 3 shows a schematic diagram of an exemplary battery pack charging circuit in an embodiment of the present application. As shown in FIG. 3, when the motor controller controls the target upper bridge arm switch module P21 and the target lower bridge arm switch module P24 to be in an off state, according to the direction of current flow, the charging circuit C2 of the battery pack P1 includes: the U-phase stator inductor L1→the resistor module R1→the resistor module R2→the V-phase stator inductor L2→a body diode of the upper bridge arm switch module P23 of the V-phase bridge arm→the positive electrode of the battery pack P1→the negative electrode of the battery pack P1→a body diode of the lower bridge arm switch module P22 of the U-phase bridge arm→the U-phase stator inductor L1.

During the charging process of the battery pack P1, the U-phase stator inductor L1 and the V-phase stator inductor L2 release energy to charge the battery pack P1.

In some embodiments of the application, the positive electrode of the battery pack is coupled to the inverter via a main positive switch, and the negative electrode of the battery pack is coupled to the inverter via a main negative switch. In some examples, the main positive switch and the main negative switch may be a relay.

Based on the first embodiment of the present application, a second embodiment of the present application provides a switch control device for the battery pack heating system. The switch control device includes a processing module.

Specifically, the processing module may be configured to: when it is determined that a switch control cycle switches from a previous cycle to a current cycle, select a target upper bridge arm switch module for the current cycle from the upper bridge arm switch modules other than the target upper bridge arm switch module for the previous cycle in the three-phase bridge arms, and/or select a target lower bridge arm switch module for the current cycle from the lower bridge arm switch modules other than the target lower bridge arm switch module for the previous cycle in the three-phase bridge arms.

The three-phase bridge arms are located in the inverter of the battery pack heating system, and the target upper bridge arm switch module and the target lower bridge arm switch module for the same switch control cycle are located in different phase bridge arms.

For example, referring to FIG. 1 and taking three consecutive switch control cycles as an example, in the first cycle, the processing module may use the first switch module P21 as the target upper bridge arm switch module and the fourth switch module P24 as the target lower bridge arm switch module; in the second cycle, the processing module may switch the target upper bridge arm switch module to the third switch module P23 and switch the target lower bridge arm switch module to the second switch module P22; in the third cycle, the processing module may keep the target upper bridge arm switch module unchanged, that is, the target upper bridge arm switch module is still the third switch module P23, and only the target lower bridge arm switch module is switched to the sixth switch module P26.

In some embodiments of the application, the switch control cycle represents a time interval between two consecutive switching instants. The switching includes switching of the target upper bridge arm switch module and/or the target lower bridge arm switch module.

In some embodiments of the present application, the target upper bridge arm switch module and the target lower bridge arm switch module need to be located in different phase bridge arms in each switch control cycle, and specific combination schemes may include but not be limited to the following six combination schemes. For ease of understanding, the present embodiment specifically describes the six combination schemes in conjunction with FIG. 1.

In the first case, the target upper bridge arm switch module is the upper bridge arm switch module of the first phase bridge arm; the target lower bridge arm switch module is the lower bridge arm switch module of the second phase bridge arm. For example, the target upper bridge arm switch module may be the upper bridge arm switch module P21 of the U-phase bridge arm and the target lower bridge arm switch module may be the lower bridge arm switch module P24 of the V-phase bridge arm, respectively.

In the second case, the target upper bridge arm switch module is the upper bridge arm switch module of the first phase bridge arm; the target lower bridge arm switch module is the lower bridge arm switch module of the third phase bridge arm. For example, the target upper bridge arm switch module may be the upper bridge arm switch module P21 of the U-phase bridge arm and the target lower bridge arm switch module may be the lower bridge arm switch module P26 of the W-phase bridge arm, respectively.

In the third case, the target upper bridge arm switch module is the upper bridge arm switch module of the second phase bridge arm; the target lower bridge arm switch module is the lower bridge arm switch module of the first phase bridge arm. For example, the target upper bridge arm switch module may be the upper bridge arm switch module P23 of the V-phase bridge arm and the target lower bridge arm switch module may be the lower bridge arm switch module P22 of the U-phase bridge arm, respectively.

In the fourth case, the target upper bridge arm switch module is the upper bridge arm switch module of the second phase bridge arm; the target lower bridge arm switch module is the lower bridge arm switch module of the third phase bridge arm. For example, the target upper bridge arm switch module may be the upper bridge arm switch module P23 of the V-phase bridge arm and the target lower bridge arm switch module may be the lower bridge arm switch module P26 of the W-phase bridge arm, respectively.

In the fifth case, the target upper bridge arm switch module is the upper bridge arm switch module of the third phase bridge arm; the target lower bridge arm switch module is the lower bridge arm switch module of the first phase bridge arm. For example, the target upper bridge arm switch module may be the upper bridge arm switch module P25 of the W-phase bridge arm and the target lower bridge arm switch module may be the lower bridge arm switch module P22 of the U-phase bridge arm, respectively.

In the sixth case, the target upper bridge arm switch module is the upper bridge arm switch module of the third phase bridge arm; the target lower bridge arm switch module is the lower bridge arm switch module of the second phase bridge arm. For example, the target upper bridge arm switch module may be the upper bridge arm switch module P25 of the W-phase bridge arm and the target lower bridge arm switch module may be the lower bridge arm switch module P24 of the V-phase bridge arm, respectively.

In some embodiments, in order to ensure that the target upper bridge arm switch module and the target lower bridge arm switch module are thermally balanced, the target upper bridge arm switch module and the target lower bridge arm switch module may be both switched when the switch control cycle switches from the previous cycle to the current cycle. Alternatively, one of the target upper bridge arm switch module and the target lower bridge arm switch module is controlled to be switched in the previous cycle, the other of the target upper bridge arm switch module and the target lower bridge arm switch module is controlled to be switched in the current cycle, and one of the target upper bridge arm switch module and the target lower bridge arm switch module is controlled to be switched in a next cycle. Or, after switching from the previous cycle to the current cycle, when only one switch module is to be switched, a number of switching times of the target upper bridge arm switch module and a number of switching times of the target lower bridge arm switch module should be maintained as same as possible for a long period of time, for example, including a number N of switching cycles. For example, within 11 consecutive switch control cycles, when the total number of switching times is 10, the number of switching times of the target upper bridge arm switch module may be 5, and the number of switching times of the target lower bridge arm switch module may be 5.

It should be noted that in the battery pack heating system, when the upper bridge arm switch module and the lower bridge arm switch module in a same bridge arm are both turned on, for example, the upper bridge arm switch module and the lower bridge arm switch module in the same bridge arm are kept in the ON state for more than 10 milliseconds, the devices in the battery pack heating system or the battery pack P1 may be burned down. In order to prevent the switch module of the upper bridge arm and the switch module of the lower bridge arm in the same bridge arm from being turned on together, the upper bridge arm switch module and the lower bridge arm switch module in the same phase bridge arm should be prevented from being simultaneously turned on. The specific implementation may be that a logic circuit is utilized in the circuit controller P20 to ensure that the switch module of the upper bridge arm and the switch module of the lower bridge arm in the same bridge arm are not turned on at the same time.

It should be noted that, in the following embodiments of the present application, for convenience of description, the bridge arm where the target upper bridge arm switch module is located may be referred to as a first target bridge arm, and the energy storage module corresponding to the first target bridge arm may be referred to as a first energy storage module. In addition, the bridge arm where the target lower bridge arm switch module is located may be referred to as a second target bridge arm, and the energy storage module corresponding to the second target bridge arm may be referred to as a second energy storage module. The energy storage module corresponding to each phase bridge arm represents the energy storage module connected to the phase bridge arm. For example, referring to FIG. 1, the inductor L1 is the energy storage module corresponding to the U-phase bridge arm, the inductor L2 is the energy storage module corresponding to the V-phase bridge arm, and the inductor L3 is the energy storage module corresponding to the W-phase bridge arm.

The processing module may be further configured to: control, during each switch control cycle, the target upper bridge arm switch module and the target lower bridge arm switch module to be turned on and off, so as to control at least two phase energy storage modules in the motor of the battery pack heating system to store and release energy and thus realize heating of the battery pack.

In some embodiments, during each switch control cycle, the target upper bridge arm switch module and the target lower bridge arm switch module may be controlled to be periodically turned on and off according to an on-off cycle. For example, when the switch control cycle is denoted as $T_0$ and the on-off cycle is denoted as $T_1$, $nT_1=T_0$.

As an example, when the on-off cycle is $T_1$, the duration of the ON state of the target upper bridge arm switch module and the target lower bridge arm switch module is to, and the duration of the OFF state of the target upper bridge arm switch module and the target lower bridge arm switch module is $t_1$, $T_1=t_0+t_1$. During the on-off cycle, the discharging duration of the battery pack P1, the energy storage duration of the first energy storage module corresponding to the first target bridge arm, and the energy storage duration of the second energy storage module corresponding to the second target bridge arm are all $t_0$. Correspondingly, the charging duration of the battery pack P1, the energy releasing duration of the first energy storage module, and the energy releasing duration of the second energy storage module are all $t_1$.

Suppose a voltage between a positive terminal and a negative terminal of the battery pack P1 is U1, the first energy storage module and the second energy storage module are inductors and the sum of the inductances thereof is 2L, and the discharging period is $0 \sim t_0$ and the charging period is $t_0 \sim t_0 + t_1$ in one on-off cycle.

In the discharging period $0 \sim t_0$, the current i and the voltage U1 in the discharging circuit satisfy the formula (1):

$$U1 = 2L \times di/dt \quad (1)$$

Here, U1 and L are constant values, and t represents the discharging time. When an initial current in the circuit of the battery pack heating system is 0, the current i starts from 0 and rises to $Ip1 = t_0 \times U1/2L$ with a slope of $K1 = U1/2L$ in the period from 0 to $t_0$.

In the charging period $t_0 \sim t_0 + t_1$, the current i in the charging circuit starts from $t_0 \times U1/2L$ and decreases with the slope of $K1 = U1/2L$.

Thus, during the on-off cycle, an effective current I is formed in the circuit of the battery pack heating system, which satisfies the formula (2):

$$\tfrac{1}{2} \times K1 \times t_0 \times t_0 - \tfrac{1}{2} \times K1 \times t_1 \times t_1 = I \times (t_0 + t_1) \quad (2)$$

Here, when the ratio of the duration of the ON state to a charge-discharge cycle is $D = t_0/(t_0 + t_1)$ and an on-off frequency of the switch module is $f = 1/(t_0 + t_1)$, the ratio D and the on-off frequency f of the switch module may be substituted into the formula (2) to derive the formula (3):

$$I = U1 \times (2D - 1)/4fL \quad (3)$$

In summary, according to formula (3), when D≤50%, the effective current I is inversely proportional to the on-off frequency f of the switch module, and the effective current I is proportional to the ratio D of the duration of the ON state to the charge-discharge cycle.

According to the switch control device and method, the motor controller and the battery pack heating control system in the embodiments of the present application, when the switch control cycle switches from the previous cycle to the current cycle, the target upper bridge arm switch module and/or the target lower bridge arm switch module are controlled to be switched. According to the technical solution of the present application, the target upper bridge arm switch module and the target lower bridge arm switch module are not always turned on during the whole process of heating the battery pack, but are continuously switched according to the switch control cycle, thereby avoiding the overheating risk due to the target upper bridge arm switch module and the target lower bridge arm switch module keeping in the ON state and thus improving the safety of the battery pack heating.

In an embodiment of the present application, the effective current in the circuit of the battery pack heating system can be adjusted by adjusting the ratio of the duration of the ON state to the charge-discharge cycle and the on-off frequency of the switch module, and then the heating speed of the battery pack P1 can be adjusted.

In some embodiments of the application, the effective current value in the circuit of the battery pack heating system can be adjusted based on a difference between a real-time temperature of the battery pack P1 and an expected heated temperature to adjust the heating speed. The heating speed is proportional to the effective current value in the circuit of the battery pack heating system. For example, depending on the difference between the real-time temperature of the battery pack P1 and the expected heated temperature, when it is determined that the heating speed needs to be increased, the effective current value in the circuit of the battery pack heating system may be increased.

In the embodiment, by adjusting the heating speed according to the difference between the real-time temperature and the expected heated temperature of the battery pack P1, a variable speed heating can be realized, the heating time can be adjusted, and thus the heating flexibility can be improved.

In some examples, the on-off frequency f of the switch module ranges from 100 Hz to 100,000 Hz.

In a preferred example, during the battery pack heating, the ratio D is set to be equal to or less than 50%, i.e., D≤50%, in order to reduce the power loss of the battery pack P1. Specifically, under the condition that D≤50% is satisfied, in each on-off cycle, the stored electrical energy in the energy storage module can be completely released, so that the stored electrical energy can be converted into the stored energy of the battery pack to the maximum extent. For example, D ranges from 5% to 50%.

In some embodiments of the present application, in each switch control cycle, the processing module may determine whether the target upper bridge arm switch module and the target lower bridge arm switch module need to be switched according to the following three cases.

In the first case, the processing module may determine whether to switch the target upper bridge arm switch module and the target lower bridge arm switch module according to the temperature of the first target bridge arm and the temperature of the second target bridge arm.

In the second case, the processing module may determine whether to switch the target upper bridge arm switch module and the target lower bridge arm switch module according to the temperature of the first energy storage module and the temperature of the second energy storage module.

In the third case, the processing module may determine whether to switch the target upper bridge arm switch module and the target lower bridge arm switch module according to the temperature of the first target bridge arm, the temperature of the first energy storage module, the temperature of the second target bridge arm, and the temperature of the second energy storage module.

For convenience of explanation, the following sections will specifically explain the above three cases by referring to the switch control modules of three types of battery pack heating systems.

Figure 4:
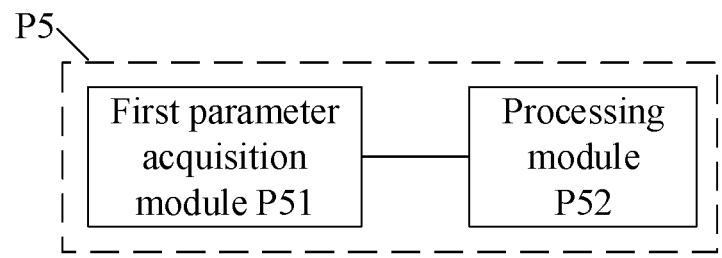
FIG. 4 is a schematic structural diagram of a switch control device of a first battery pack heating system according to a second embodiment of the present application.

For the First Case Above:

In some embodiments of the present application, FIG. 4 is a schematic structural diagram of a switch control device of a first battery pack heating system according to a second embodiment of the present application. As shown in FIG. 4, the switch control device P5 includes a first parameter acquisition module P51 and a processing module P52.

The first parameter acquisition module P51 may be configured to acquire a temperature of a first target bridge arm and a temperature of a second target bridge arm.

The processing module P52 may be further configured to select a new target upper bridge arm switch module from the switch modules of the bridge arms other than the first target bridge arm among the three-phase bridge arms when the temperature of the first target bridge arm exceeds a preset safety temperature threshold interval.

The processing module P52 may be further configured to select a new target lower bridge arm switch module from the switch modules of the bridge arms other than the second target bridge arm among the three-phase bridge arms when the temperature of the second target bridge arm exceeds the safety temperature threshold interval.

Herein, the first target bridge arm is a bridge arm of the three-phase bridge arms where the target upper bridge arm switch module is located, and the second target bridge arm is a bridge arm of the three-phase bridge arms where the target lower bridge arm switch module is located.

It should be emphasized that in order to form effective charging and discharging circuits, the target upper bridge arm switch module and the target lower bridge arm switch module need to be located in different bridge arms.

In some embodiments, specific implementations of the target upper bridge arm switch module and the target lower bridge arm switch module can be understood by referring to the content of the foregoing embodiments, and details are not described herein again.

In some embodiments, the first parameter acquisition module P51 may include a plurality of temperature sensors. Specifically, a temperature sensor for acquiring a temperature of the U-phase bridge arm, a temperature sensor for acquiring a temperature of the V-phase bridge arm, and a temperature sensor for acquiring a temperature of the W-phase bridge arm may be included. For example, the temperature sensor may be specifically a Negative Temperature Coefficient (Negative Temperature Coefficient, NTC) temperature sensor.

In some embodiments, the temperature of the first target bridge arm and the temperature of the second target bridge arm are respectively the temperature of the target upper bridge arm switch module and the temperature of the target lower bridge arm switch module. Alternatively, when an upper bridge arm switch module and a lower bridge arm switch module of a bridge arm are integrated in a same IGBT chip, the temperature of the IGBT chip may be acquired as the temperature of the bridge arm.

It should be noted that when the upper bridge arm switch module and the lower bridge arm switch module of each bridge arm are integrated on a same IGBT chip, the temperature of the upper bridge arm switch module of the bridge arm and the temperature of the lower bridge arm switch module are equal or approximately equal.

In some embodiments, the preset safety temperature threshold interval may represent a temperature value interval within which the switch module can operate normally. Specifically, the switch module and the energy storage module may correspond to a same preset safety temperature threshold interval or correspond to different preset safety temperature threshold intervals, which is not limited herein.

In one embodiment, the preset safety temperature threshold interval may be set according to working scenes and requirements, which is not limited herein.

For convenience of explanation, specific implementations illustrating the selection of the target upper bridge arm switch module and the target lower bridge arm switch module in the first case will be described in detail below by referring to two embodiments.

In the first embodiment, when the acquired temperature of the first target bridge arm exceeds the preset safety temperature threshold interval, the target upper bridge arm switch module and the target lower bridge arm switch module may be selected by the following two specific modes.

The first selection mode in the first embodiment: the upper bridge arm switch module of the second target bridge arm is selected as the new target upper bridge arm switch module, and the lower bridge arm switch module of the bridge arm other than the first target bridge arm and the second target bridge arm among the three-phase bridge arms is selected as the new target lower bridge arm switch module.

In some embodiments, when the first selection mode is selected, the processing module P52 may be further configured to: when the temperature of the first target bridge arm exceeds the preset safety temperature threshold interval, select the lower bridge arm switch module of the bridge arm other than the first target bridge arm and the second target bridge arm among the three-phase bridge arms as the new target lower bridge arm switch module.

As an example, referring to FIG. 1, when the first switch module P21 is the target upper bridge arm switch module and the fourth switch module P24 is the target lower bridge arm switch module, in the first selection mode, the third switch module P23 may be selected as the new target upper bridge arm switch module, and the sixth switch module P26 may be selected as the new target lower bridge arm switch module.

It should be noted that the V-phase bridge arm where the third switch module P23 is located becomes the new first target bridge arm, and the V-phase stator inductor L2 becomes the new first energy storage module; the W-phase bridge arm where the sixth switch module P26 is located becomes the new second target bridge arm, the W-phase stator inductor L3 becomes the new second energy storage module.

The second selection mode in the first embodiment: the upper bridge arm switch module of the bridge arm other than the first target bridge arm and the second target bridge arm among the three-phase bridge arms is selected as the new target upper bridge arm switch module, and the target lower bridge arm switch module keeps unchanged.

As an example, with continued reference to FIG. 1, when the first switch module P21 is the target upper bridge arm switch module and the fourth switch module P24 is the target lower bridge arm switch module, in the second selection mode, the fifth switch module P25 may be selected as the new target upper bridge arm switch module, and the fourth switch module P24 is still the target lower bridge arm switch module.

It should be noted that the W-phase bridge arm where the fifth switch module P25 is located becomes the new first target bridge arm, and the W-phase stator inductor L3 becomes the new first energy storage module; since the target lower bridge arm switch module is still the fourth switch module P24, the second target bridge arm and the second energy storage module are not changed.

In the second embodiment, when the acquired temperature of the second target bridge arm exceeds the preset safety temperature threshold interval, the target upper bridge arm switch module and the target lower bridge arm switch module may be selected by the following two specific modes.

The first selection mode in the second embodiment: the upper bridge arm switch module of the bridge arm other than the first target bridge arm and the second target bridge arm among the three-phase bridge arms is selected as the new target lower bridge arm switch module, and the lower bridge arm switch module of the first target bridge arm is selected as the new target lower bridge arm switch module.

In some embodiments, when the first selection mode is selected, the processing module P52 may be further configured to: when the temperature of the second target bridge arm exceeds the preset safety temperature threshold interval, select the upper bridge arm switch module of the bridge arm other than the first target bridge arm and the second target bridge arm among the three-phase bridge arms as the new target upper bridge arm switch module.

The second selection mode in the second embodiment: the lower bridge arm switch module of the bridge arm other than the first target bridge arm and the second target bridge arm among the three-phase bridge arms is selected as the new target lower bridge arm switch module, and the target upper bridge arm switch module keeps unchanged.

In some embodiments, the processing module P52 may be further configured to: control all switch modules of the three-phase bridge arms to be in an OFF state when both the temperature of the first target bridge arm and the temperature of the second target bridge arm exceed the safety temperature threshold interval.

It should be noted that when the temperature of the first target bridge arm exceeds the safety temperature threshold interval, the upper bridge arm switch module and the lower bridge arm switch module of the first target bridge arm are not suitable for being selected as the target upper bridge arm switch module and the target lower bridge arm switch module.

Correspondingly, when the temperature of the second target bridge arm exceeds the safety temperature threshold interval, the upper bridge arm switch module and the lower bridge arm switch module of the second target bridge arm are not suitable for being selected as the target upper bridge arm switch module and the target lower bridge arm switch module.

At this time, it is impossible to select an appropriate target upper bridge arm switch module and target lower bridge arm switch module from the six switch modules of the inverter P2. In order to ensure safety, charging and discharging of the battery pack P1 should be stopped.

In some embodiments, after all the switch modules of the three-phase bridge arms are in the OFF state, the temperatures of each switch module and each energy storage module may gradually decrease. In order to balance safety and heating efficiency, after all the switch modules of the three-phase bridge arms are kept in the OFF state, the processing module P52 may be further configured to acquire the temperature of the first target bridge arm and the temperature of the second target bridge arm after a preset time period.

The preset time period may be determined according to factors such as an external ambient temperature of the battery pack heating system and a heat dissipation performance of the battery pack heating system. For example, the preset time period may be 3 seconds.

The processing module P52 may be further configured to: select a new target upper bridge arm switch module and a new target lower bridge arm switch module from all the switch modules of the three-phase bridge arms when the temperature of the first target bridge arm and the temperature of the second target bridge arm fall back into the safety temperature threshold interval.

It should be noted that when the temperature of the first target bridge arm and the temperature of the second target bridge arm both fall within the safety temperature threshold interval, it can be identified that the temperatures of all the switch modules in the three-phase bridge arms and all the energy storage modules in the motor P3 are normal. Therefore, the new target upper bridge arm switch module and the new target lower bridge arm switch module can be selected from the six switch modules.

When the temperature of the first target bridge arm exceeds the preset safety temperature threshold interval and the temperature of the second target bridge arm falls within the safety temperature threshold interval, the new target upper bridge arm switch module may be selected from the switch modules of the bridge arms of the three-phase bridge arms other than the first target bridge arm.

It should be noted that when the temperature of the second target bridge arm and the temperature of the second energy storage module both fall within the safety temperature threshold interval, the upper bridge arm switch module of the second target bridge arm may be selected as an candidate for the target upper bridge arm switch module, and the lower bridge arm switch module of the second target bridge arm may be selected as an candidate for the target lower bridge arm switch module.

As an example, the upper bridge arm switch module of the second target bridge arm may be selected as the new target upper bridge arm switch module, and the lower bridge arm switch module of the bridge arm of the three-phase bridge arms other than the first target bridge arm and the second target bridge arm may be selected as the new target lower bridge arm switch module.

As another example, the upper bridge arm switch module of the bridge arm of the three-phase bridge arms other than the first target bridge arm and the second target bridge arm may be selected as the new target upper bridge arm switch module; the lower bridge arm switch module of the second target bridge arm may be selected as the new target lower bridge arm switch module.

When the temperature of the second target bridge arm exceeds the safety temperature threshold interval and the temperature of the first target bridge arm falls within the safety temperature threshold interval, the new target lower bridge arm switch module may be selected from the switch modules of the bridge arms of the three-phase bridge arms other than the second target bridge arm.

It should be noted that when the temperature of the first target bridge arm falls within the safety temperature threshold interval, the upper bridge arm switch module of the first target bridge arm may be selected as an candidate for the target upper bridge arm switch module, and the lower bridge arm switch module of the first target bridge arm may be selected as an candidate for the target lower bridge arm switch module.

As an example, the upper bridge arm switch module of the first target bridge arm may be selected as the new target upper bridge arm switch module, and the lower bridge arm switch module of the bridge arm of the three-phase bridge arms other than the first target bridge arm and the second target bridge arm may be selected as the new target lower bridge arm switch module.

As another example, the upper bridge arm switch module of the bridge arm of the three-phase bridge arms other than the first target bridge arm and the second target bridge arm may be selected as the new target upper bridge arm switch module; the lower bridge arm switch module of the first target bridge arm may be selected as the new target lower bridge arm switch module.

In an embodiment, when the temperature of the first target bridge arm exceeds the safety temperature threshold interval and the temperature of the second target bridge arm exceeds the safety temperature threshold interval, the temperature of the first target bridge arm and the temperature of the second target bridge arm may be acquired after a preset period of time to determine if the temperatures exceed the preset safety temperature threshold interval.

In some embodiments, in order to conveniently control the vehicle control system or for the driver to know an over-temperature fault of the battery pack heating system in time and handle the over-temperature fault, the switch control device may further includes a fault reporting module.

The fault reporting module may be configured to report over-temperature fault information of the battery pack heating system to a vehicle controller when the temperature of the first target bridge arm exceeds a corresponding maximum tolerable temperature and the temperature of the second target bridge arm and the temperature of the second energy storage module exceeds a corresponding maximum tolerable temperature.

In an embodiment, after over-temperature information is reported to the vehicle controller and is known by a relevant personnel, the battery pack heating system can be repaired or inspected.

In an embodiment, the maximum tolerable temperature represents an over-temperature of a target bridge arm, and is greater than or equals to an upper limit of the safety temperature threshold interval.

Figure 5:
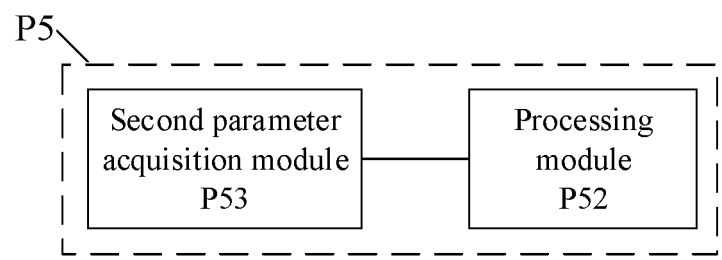
FIG. 5 is a schematic structural diagram of a switch control device of a second battery pack heating system according to a second embodiment of the present application.

For the Second Case Above:

In some embodiments of the present application, FIG. 5 is a schematic structural diagram of a switch control device of a second battery pack heating system according to a second embodiment of the present application. As shown in FIG. 5, the switch control device P5 includes a second parameter acquisition module P53 and a processing module P52.

The second parameter acquisition module P53 may be configured to acquire a temperature of a first energy storage module corresponding to a first target bridge arm and a temperature of a second energy storage module corresponding to a second target bridge arm.

The processing module P52 may be further configured to select a new target upper bridge arm switch module from the switch modules of the bridge arms other than the first target bridge arm among the three-phase bridge arms when the temperature of the first energy storage module exceeds a preset safety temperature threshold interval.

The processing module P52 may be further configured to select a new target lower bridge arm switch module from the switch modules of the bridge arms other than the second target bridge arm among the three-phase bridge arms when the temperature of the second energy storage module exceeds the safety temperature threshold interval.

In some embodiments, specific combinations of the target upper bridge arm switch module and the target lower bridge arm switch module can be understood by referring to the content of the foregoing embodiments, and details are not described herein again.

In some embodiments, the second parameter acquisition module P53 may include a temperature sensor for acquiring a temperature of the U-phase stator inductor L1, a temperature sensor for acquiring a temperature of the V-phase stator inductor L2, and a temperature sensor for acquiring a temperature of the W-phase stator inductor L3. For example, the temperature sensor may be specifically a Negative Temperature Coefficient (Negative Temperature Coefficient, NTC) temperature sensor.

For example, referring to FIG. 1, when the first target bridge arm is the U-phase bridge arm and the second target bridge arm is the W-phase bridge arm, the parameter acquisition module P53 may acquire the temperature of the U-phase stator inductor L1 corresponding to the first target bridge arm via the temperature sensor and acquire the temperature of the W-phase stator inductor L3 corresponding to the second target bridge arm via the temperature sensor.

It should be noted that the first target bridge arm may be any of the U-phase bridge arm, the V-phase bridge arm, and the W-phase bridge arm. Specifically, when the first switch module P21 is the target upper bridge arm switch module, the first target bridge arm is the U-phase bridge arm, and the first energy storage module is the U-phase stator inductor L1; when the third switch module P23 is the target upper bridge arm switch module, the first target bridge arm is the V-phase bridge arm, and the first energy storage module is the V-phase stator inductor L2; and when the fifth switch module P25 is the target upper bridge arm switch module, the first target bridge arm is the W-phase bridge arm, and the first energy storage module is the W-phase stator inductor L3.

The second target bridge arm may also be any of the U-phase bridge arm, the V-phase bridge arm, and the W-phase bridge arm. Specifically, when the second switch module P22 is the target lower bridge arm switch module, the second target bridge arm is the U-phase bridge arm, and the second energy storage module is the U-phase stator inductor L1; when the fourth switch module P24 is the target lower bridge arm switch module, the second target bridge arm is the V-phase bridge arm, and the second energy storage module is the V-phase stator inductor L2; and when the sixth switch module P26 is the target lower bridge arm switch module, the second target bridge arm is the W-phase bridge arm, and the second energy storage module is the W-phase stator inductor L3.

It should be noted that, in the process of charging and discharging the battery pack, when a switch module of a phase bridge arm is periodically turned on and off, an energy storage module corresponding to the phase bridge arm periodically stores and releases energy. When the state of the phase bridge arm is switched from a periodic on-off state to a continuous off state, the energy storage module of the phase bridge arm stops the energy storage and releasing, and the temperature of the energy storage module of the phase bridge arm also stops increasing. Therefore, when the temperature of the first energy storage module is too high, the first energy storage module can be controlled to stop the energy storage and releasing by controlling the target upper bridge arm switch module to be in an off state, thereby further preventing the temperature of the first energy storage module from continuously rising.

Therefore, when the temperature of the first target bridge arm exceeds the preset safety temperature threshold interval, for safety reasons, the target upper bridge arm switch module should be kept in the off state to avoid the risk caused by various faults such as over-temperature damages of individual devices.

In some embodiments, the preset safety temperature threshold interval may represent a temperature value interval within which the energy storage module can operate normally. Specifically, the switch module and the energy storage module may correspond to a same preset safety temperature threshold interval or correspond to different preset safety temperature threshold intervals, which is not limited herein.

In an embodiment, the preset safety temperature threshold interval may be set according to working scenes and requirements, which is not limited herein.

For convenience of explanation, specific implementations illustrating the selection of the target upper bridge arm switch module and the target lower bridge arm switch module in the second case will be described in detail below by referring to two embodiments.

In the first embodiment, when the acquired temperature of the first energy storage module exceeds the preset safety temperature threshold interval, the target upper bridge arm switch module and the target lower bridge arm switch module may be selected by the following two specific modes.

The first selection mode in the first embodiment: the upper bridge arm switch module of the second target bridge arm is selected as the new target upper bridge arm switch module, and the lower bridge arm switch module of the bridge arm other than the first target bridge arm and the second target bridge arm among the three-phase bridge arms is selected as the new target lower bridge arm switch module.

In some embodiments, when the first selection mode is selected, the processing module P52 may be further configured to: when the temperature of the first energy storage module exceeds the preset safety temperature threshold interval, select the lower bridge arm switch module of the bridge arm other than the first target bridge arm and the second target bridge arm among the three-phase bridge arms as the new target lower bridge arm switch module.

The second selection mode in the first embodiment: the upper bridge arm switch module of the bridge arm other than the first target bridge arm and the second target bridge arm among the three-phase bridge arms is selected as the new target upper bridge arm switch module, and the target lower bridge arm switch module keeps unchanged.

In the second embodiment, when the acquired temperature of the second energy storage module exceeds the preset safety temperature threshold interval, the target upper bridge arm switch module and the target lower bridge arm switch module may be selected by the following two specific modes.

The first selection mode in the second embodiment: the upper bridge arm switch module of the bridge arm other than the first target bridge arm and the second target bridge arm among the three-phase bridge arms is selected as the new target lower bridge arm switch module, and the lower bridge arm switch module of the first target bridge arm is selected as the new target lower bridge arm switch module.

In some embodiments, when the first selection mode is selected, the processing module P52 may be further configured to: when the temperature of the second energy storage module exceeds the preset safety temperature threshold interval, select the upper bridge arm switch module of the bridge arm other than the first target bridge arm and the second target bridge arm among the three-phase bridge arms as the new target upper bridge arm switch module.

The second selection mode in the first embodiment: the lower bridge arm switch module of the bridge arm other than the first target bridge arm and the second target bridge arm among the three-phase bridge arms is selected as the new target lower bridge arm switch module, and the target upper bridge arm switch module keeps unchanged.

In some embodiments, the processing module P52 may be further configured to: control all switch modules of the three-phase bridge arms to be in an OFF state when both the temperature of the first energy storage module and the temperature of the second energy storage module exceed the safety temperature threshold interval.

It should be noted that when the temperature of the first energy storage module exceeds the safety temperature threshold interval, the upper bridge arm switch module and the lower bridge arm switch module of the first target bridge arm are not suitable for being selected as the target upper bridge arm switch module and the target lower bridge arm switch module.

Correspondingly, when the temperature of the second energy storage module exceeds the safety temperature threshold interval, the upper bridge arm switch module and the lower bridge arm switch module of the second target bridge arm are not suitable for being selected as the target upper bridge arm switch module and the target lower bridge arm switch module.

At this time, it is impossible to select an appropriate target upper bridge arm switch module and target lower bridge arm switch module from the six switch modules of the inverter P2. In order to ensure safety, charging and discharging of the battery pack P1 should be stopped.

In some embodiments, after all the switch modules of the three-phase bridge arms are in the OFF state, the temperatures of each switch module and each energy storage module may gradually decrease. In order to balance safety and heating efficiency, after all the switch modules of the three-phase bridge arms are kept in the OFF state, the processing module P52 may be further configured to acquire the temperature of the first energy storage module and the temperature of the second energy storage module after a preset time period.

The preset time period may be determined according to factors such as an external ambient temperature of the battery pack heating system and a heat dissipation performance of the battery pack heating system. For example, the preset time period may be 3 seconds.

The processing module P52 may be further configured to: select a new target upper bridge arm switch module and a new target lower bridge arm switch module from all the switch modules of the three-phase bridge arms when the temperature of the first energy storage module and the temperature of the second energy storage module both fall within the safety temperature threshold interval.

It should be noted that when the temperature of the first energy storage module and the temperature of the second energy storage module both fall within the safety temperature threshold interval, it can be identified that the temperatures of all the switch modules in the three-phase bridge arms and all the energy storage modules in the motor P3 are normal. Therefore, the new target upper bridge arm switch module and the new target lower bridge arm switch module can be selected from the six switch modules.

When the temperature of the first energy storage module exceeds the preset safety temperature threshold interval and the temperature of the second energy storage module falls within the safety temperature threshold interval, the new target upper bridge arm switch module may be selected from the switch modules of the bridge arms of the three-phase bridge arms other than the first target bridge arm.

It should be noted that when the temperature of the second energy storage module falls within the safety temperature threshold interval, the upper bridge arm switch module of the second target bridge arm may be selected as an candidate for the target upper bridge arm switch module, and the lower bridge arm switch module of the second target bridge arm may be selected as an candidate for the target lower bridge arm switch module.

As an example, the upper bridge arm switch module of the second target bridge arm may be selected as the new target upper bridge arm switch module, and the lower bridge arm switch module of the bridge arm of the three-phase bridge arms other than the first target bridge arm and the second target bridge arm may be selected as the new target lower bridge arm switch module.

As another example, the upper bridge arm switch module of the bridge arm of the three-phase bridge arms other than the first target bridge arm and the second target bridge arm may be selected as the new target upper bridge arm switch module; the lower bridge arm switch module of the second target bridge arm may be selected as the new target lower bridge arm switch module.

When the temperature of the second energy storage module exceeds the safety temperature threshold interval and the temperature of the first energy storage module falls within the safety temperature threshold interval, the new target lower bridge arm switch module may be selected from the switch modules of the bridge arms of the three-phase bridge arms other than the second target bridge arm.

It should be noted that when the temperature of the first energy storage module falls within the safety temperature threshold interval, the upper bridge arm switch module of the first target bridge arm may be selected as an candidate for the target upper bridge arm switch module, and the lower bridge arm switch module of the first target bridge arm may be selected as an candidate for the target lower bridge arm switch module.

As an example, the upper bridge arm switch module of the first target bridge arm may be selected as the new target upper bridge arm switch module, and the lower bridge arm switch module of the bridge arm of the three-phase bridge arms other than the first target bridge arm and the second target bridge arm may be selected as the new target lower bridge arm switch module.

As another example, the upper bridge arm switch module of the bridge arm of the three-phase bridge arms other than the first target bridge arm and the second target bridge arm may be selected as the new target upper bridge arm switch module; the lower bridge arm switch module of the first target bridge arm may be selected as the new target lower bridge arm switch module.

In an embodiment, when the temperature of the first energy storage module exceeds the safety temperature threshold interval and the temperature of the second energy storage module exceeds the safety temperature threshold interval, the temperature of the first energy storage module and the temperature of the second energy storage module may be acquired after a preset period of time to determine if the temperatures exceed the preset safety temperature threshold interval.

In some embodiments, in order to conveniently control the vehicle control system or for the driver to know an over-temperature fault of the battery pack heating system in time and handle the over-temperature fault, the switch control device may further includes a fault reporting module.

The fault reporting module may be configured to report over-temperature fault information of the battery pack heating system to a vehicle controller when the temperature of the first energy storage module exceeds a corresponding maximum tolerable temperature and the temperature of the second energy storage module exceeds a corresponding maximum tolerable temperature.

In some embodiments, after over-temperature information is reported to the vehicle controller and is known by a relevant personnel, the battery pack heating system can be repaired or inspected.

In an embodiment, a maximum tolerable temperature represents an over-temperature of an energy storage module, and is greater than or equals to an upper limit of the safety temperature threshold interval.

Figure 6:
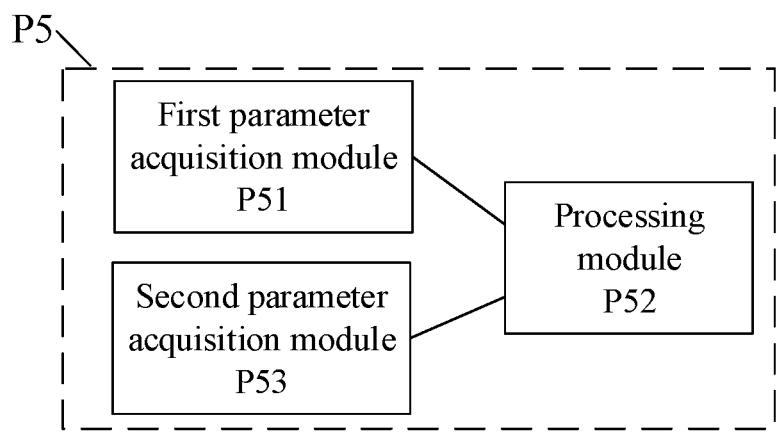
FIG. 6 is a schematic structural diagram of a switch control device of a third battery pack heating system according to a second embodiment of the present application.

For the Third Case Above:

In some embodiments of the present application, FIG. 6 is a schematic structural diagram of a switch control device of a third battery pack heating system according to a second embodiment of the present application. As shown in FIG. 6, the switch control device P5 includes a first parameter acquisition module P51, a second parameter acquisition module P53 and a processing module P52.

It should be noted that the first parameter acquisition module P51, the second parameter acquisition module P53, and the processing module P52 can be understood by referring to related content in the foregoing embodiments, and details are not described herein again.

The difference from the above two cases is the specific implementation of selection of the target upper bridge arm switch module and the target lower bridge arm switch module.

When the acquired temperature of the first target bridge arm and the acquired temperature of the first energy storage module corresponding to the first target bridge arm exceed the preset safety temperature threshold interval, two possible specific selection modes are as follows.

The first selection mode: the upper bridge arm switch module of the second target bridge arm is selected as the new target upper bridge arm switch module, and the lower bridge arm switch module of the bridge arm other than the first target bridge arm and the second target bridge arm among the three-phase bridge arms is selected as the new target lower bridge arm switch module.

The second selection mode: the upper bridge arm switch module of the bridge arm other than the first target bridge arm and the second target bridge arm among the three-phase bridge arms is selected as the new target upper bridge arm switch module, and the target lower bridge arm switch module is kept unchanged.

When the acquired temperature of the second target bridge arm and the acquired temperature of the second energy storage module corresponding to the second target bridge arm exceed the safety temperature threshold interval, two possible specific selection modes are as follows.

The first selection mode: the upper bridge arm switch module of the bridge arm other than the first target bridge arm and the second target bridge arm among the three-phase bridge arms is selected as the new target upper bridge arm switch module, and the lower bridge arm switch module of the first target bridge arm is selected as the new target lower bridge arm switch module.

The second selection mode: the target upper bridge arm switch module is kept unchanged, and the lower bridge arm switch module of the bridge arm other than the first target bridge arm and the second target bridge arm among the three-phase bridge arms is selected as the new target lower bridge arm switch module.

In some embodiments, the preset safety temperature threshold interval may be understood by referring to the foregoing embodiments of the present application, and details are not described herein again.

In some embodiments, the first parameter acquisition module P51 and the second parameter acquisition module P53 may be separately configured, or may be integrated into one unit, for example, integrated into a parameter acquisition module P54.

As an example, FIG. 7 is a schematic structural diagram of a switch control device of an exemplary battery pack heating system according to a second embodiment of the present application. As shown in FIG. 7, the parameter acquisition module P54 acquires the temperature of the U-phase bridge arm through the temperature sensor N1, acquires the temperature of the V-phase bridge arm through the temperature sensor N2, acquires the temperature of the W-phase bridge arm through the temperature sensor N3, acquires the temperature of the U-phase stator inductor L1 through the temperature sensor N4, acquires the temperature of the V-phase stator inductor L2 through the temperature sensor N5, and acquires the temperature of the W-phase stator inductor L3 through the temperature sensor N6.

According to the switch control device in the embodiment, when at least one of the temperature of the first target bridge arm and the temperature of the first energy storage module exceeds the preset safety temperature threshold interval, it is possible to select a new target upper bridge arm switch module and turn off the previous target upper bridge arm switch module in time; when at least one of the temperature of the second target bridge arm and the temperature of the second energy storage module exceeds the preset safety temperature threshold interval, it is possible to select a new target lower bridge arm switch module and turn off the previous target lower bridge arm switch module in time. According to the technical solution of the present application, when the temperature of the switch module and the energy storage module is too high, a new target upper bridge arm switch module or a new target lower bridge arm switch module may be selected so as to avoid device damages caused by continuous use of overheated switch modules and energy storage modules, thereby improving the safety of the heating of the battery pack P1.

In some embodiments, the processing module P52 may be further configured to: control all switch modules of the three-phase bridge arms to be in an OFF state when both the acquired temperature of the first target bridge arm and the acquired temperature of the second target bridge arm exceed the preset safety temperature threshold interval. It should be noted that the related content can be understood by referring to the description of the corresponding part of the first case, and will not be described again.

Alternatively, the processing module P52 may be further configured to: control all switch modules of the three-phase bridge arms to be in an OFF state when both the acquired temperature of the first energy storage module corresponding to the first target bridge arm and the acquired temperature of the second energy storage module corresponding to the second target bridge arm exceed the preset safety temperature threshold interval. It should be noted that the related content can be understood by referring to the description of the corresponding part of the first case, and will not be described again.

Alternatively, the processing module P52 may be further configured to: control all switch modules of the three-phase bridge arms to be in an OFF state when both the acquired temperature of the first target bridge arm and the acquired temperature of the second energy storage module exceed the preset safety temperature threshold interval or both the acquired temperature of the second target bridge arm and the acquired temperature of the first energy storage module exceed the preset safety temperature threshold interval.

It should be noted that when at least one of the temperature of the first target bridge arm and the temperature of the first energy storage module exceeds the safety temperature threshold interval, the upper bridge arm switch module and the lower bridge arm switch module of the first target bridge arm are not suitable for being selected as the target upper bridge arm switch module and the target lower bridge arm switch module.

Correspondingly, when at least one of the temperature of the second target bridge arm and the temperature of the second energy storage module exceeds the safety temperature threshold interval, the upper bridge arm switch module and the lower bridge arm switch module of the second target bridge arm are not suitable for being selected as the target upper bridge arm switch module and the target lower bridge arm switch module.

At this time, it is impossible to select an appropriate target upper bridge arm switch module and target lower bridge arm switch module from the six switch modules of the inverter P2. In order to ensure safety, charging and discharging of the battery pack P1 should be stopped.

In some embodiments, after all the switch modules of the three-phase bridge arms are in the OFF state, the temperatures of each switch module and each energy storage module may gradually decrease. In order to balance safety and heating efficiency, after all the switch modules of the three-phase bridge arms are kept in the OFF state, the processing module P52 may be further configured to: acquire the temperature of the first target bridge arm, the temperature of the second target bridge arm, the temperature of the first energy storage module and the temperature of the second energy storage module after a preset time period.

The preset time period may be determined according to factors such as an external ambient temperature of the battery pack heating system and a heat dissipation performance of the battery pack heating system. For example, the preset time period may be 3 seconds.

The processing module P52 may be further configured to reselect a target upper bridge arm switch module and a target lower bridge arm switch module based on the temperature of the first target bridge arm, the temperature of the second target bridge arm, the temperature of the first energy storage module, and the temperature of the second energy storage module.

As a first example, when the temperature of the first target bridge arm, the temperature of the first energy storage module, the temperature of the second target bridge arm and the temperature of the second energy storage module all fall within the safety temperature threshold interval, the new target upper bridge arm switch module and the new target lower bridge arm switch module may be selected from all the switch modules of the three-phase bridge arms.

It should be noted that when the temperature of the first target bridge arm, the temperature of the first energy storage module, the temperature of the second target bridge arm and the temperature of the second energy storage module all fall within the safety temperature threshold interval, it can be identified that the temperatures of all the switch modules in the three-phase bridge arms and all the energy storage modules in the motor P3 are normal. Therefore, the new target upper bridge arm switch module and the new target lower bridge arm switch module can be selected from the six switch modules.

As a second example, when at least one of the temperature of the first target bridge arm and the temperature of the first energy storage module exceeds the preset safety temperature threshold interval and the temperature of the second target bridge arm and the temperature of the second energy storage module both fall within the safety temperature threshold interval, the new target upper bridge arm switch module may be selected from the switch modules of the bridge arms of the three-phase bridge arms other than the first target bridge arm.

It should be noted that when the temperature of the second target bridge arm and the temperature of the second energy storage module both fall within the safety temperature threshold interval, the upper bridge arm switch module of the second target bridge arm may be selected as an candidate for the target upper bridge arm switch module, and the lower bridge arm switch module of the second target bridge arm may be selected as an candidate for the target lower bridge arm switch module.

As an example, the upper bridge arm switch module of the second target bridge arm may be selected as the new target upper bridge arm switch module, and the lower bridge arm switch module of the bridge arm of the three-phase bridge arms other than the first target bridge arm and the second target bridge arm may be selected as the new target lower bridge arm switch module.

As another example, the upper bridge arm switch module of the bridge arm of the three-phase bridge arms other than the first target bridge arm and the second target bridge arm may be selected as the new target upper bridge arm switch module; the lower bridge arm switch module of the second target bridge arm may be selected as the new target lower bridge arm switch module.

As a third example, when at least one of the temperature of the second target bridge arm and the temperature of the second energy storage module exceeds the safety temperature threshold interval and the temperature of the first target bridge arm and the temperature of the first energy storage module both fall within the safety temperature threshold interval, the new target lower bridge arm switch module may be selected from the switch modules of the bridge arms of the three-phase bridge arms other than the second target bridge arm.

It should be noted that when the temperature of the first target bridge arm and the temperature of the first energy storage module both fall within the safety temperature threshold interval, the upper bridge arm switch module of the first target bridge arm may be selected as an candidate for the target upper bridge arm switch module, and the lower bridge arm switch module of the first target bridge arm may be selected as an candidate for the target lower bridge arm switch module.

As an example, the upper bridge arm switch module of the first target bridge arm may be selected as the new target upper bridge arm switch module, and the lower bridge arm switch module of the bridge arm of the three-phase bridge arms other than the first target bridge arm and the second target bridge arm may be selected as the new target lower bridge arm switch module.

As another example, the upper bridge arm switch module of the bridge arm of the three-phase bridge arms other than the first target bridge arm and the second target bridge arm may be selected as the new target upper bridge arm switch module; the lower bridge arm switch module of the first target bridge arm may be selected as the new target lower bridge arm switch module.

In an embodiment, when at least one of the temperature of the first target bridge arm and the first energy storage module exceeds the safety temperature threshold interval and the temperature of the second target bridge arm and the temperature of the second energy storage module both exceed the safety temperature threshold interval, the temperature of the first target bridge arm, the temperature of the first energy storage module, the temperature of the second target bridge arm and the temperature of second first energy storage module may be acquired after a preset period of time to determine if the temperatures exceed the preset safety temperature threshold interval.

In some embodiments, in order to conveniently control the vehicle control system or for the driver to know an over-temperature fault of the battery pack heating system in time and handle the over-temperature fault, the switch control device may further includes a fault reporting module.

The fault reporting module may be configured to report over-temperature fault information of the battery pack heating system to a vehicle controller when the acquired temperature of the first target bridge arm and the acquired temperature of the second target bridge arm exceed a corresponding maximum tolerable temperature.

Alternatively, the fault reporting module may be further configured to report over-temperature fault information of the battery pack heating system to the vehicle controller when the acquired temperature of the first energy storage module and the acquired temperature of the second energy storage module exceed a corresponding maximum tolerable temperature.

Alternatively, the fault reporting module may be further configured to report over-temperature fault information of the battery pack heating system to the vehicle controller when the acquired temperature of the first target bridge arm and the acquired temperature of the second energy storage module exceed a corresponding maximum tolerable temperature or when the acquired temperature of the second target bridge arm and the acquired temperature of the first energy storage module exceed a corresponding maximum tolerable temperature.

In some embodiments, after over-temperature information is reported to the vehicle controller and is known by a relevant personnel, the battery pack heating system can be repaired or inspected.

In an embodiment, the maximum tolerable temperature can be understood by referring to the related part of the foregoing embodiments, and details are not described herein again.

In some embodiments of the present application, in order to improve the safety of heating, the processing module P52 may be further configured to control all the switch modules of the three-phase bridge arms to be in an off state in response to a stop-heating instruction sent by the battery pack management module.

The stop-heating instruction indicates that a state parameter of the battery pack meets a preset stop-heating condition.

In the embodiment, during the heating of the battery pack P1, in order to ensure the safety of heating, it is necessary to monitor the state of the battery pack in real time. When it is determined that it is not necessary or possible to continue to heat the battery pack P1, the heating can be stopped by controlling the switch module to be turned off in time.

In some embodiments, when the state parameter of the battery pack P1 includes the temperature of the battery pack P1, the preset stop-heating condition includes the temperature being greater than or equal to an expected temperature threshold. That is, once it is monitored that the temperature of the battery pack P1 is heated to the expected temperature threshold, the heating of the battery pack P1 can be stopped in time. For example, the expected temperature threshold may also be a minimum required temperature at which the battery pack P1 can operate normally, i.e., a heating temperature threshold at which the battery pack heating system needs to enter the heating mode. The heating temperature threshold may be set according to working scenes and requirements, which is not limited herein. When the temperature of the battery pack P1 is lower than the heating temperature threshold, the battery pack P1 cannot operate normally and needs to be heated.

When the state parameter includes a state of charge, the preset stop-heating condition includes the state of charge being less than or equal to an allowable state of charge threshold for heating. That is, once it is detected that the current state of charge is not greater than the allowable state of charge threshold for heating, it is necessary to stop heating the battery pack P1.

In an example, the allowable state of charge threshold for heating represents a minimum required state of charge that allows battery pack P1 to be heated, i.e., a state of charge threshold at which the battery pack heating system needs to enter the heating mode. The state of charge threshold can be set according to working scenes and requirements, which is not limited herein. When the state of charge of the battery pack P1 is higher than the state of charge threshold, it means that the current power of the battery pack P1 is sufficient to provide the power required to enter the heating mode, and when the state of charge of the battery pack P1 is lower than the state of charge threshold, it means that it is impossible to provide sufficient power to keep heating the battery pack P1.

In some embodiments of the present application, the switch control device may further include: a current parameter acquisition module, a calculation module, and a signal adjustment module.

The current parameter acquisition module may be configured to acquire a current parameter of the battery pack heating system.

In some embodiments, the current parameter acquisition module may be specifically implemented as a current sensor. For example, it may be specifically a Hall sensor.

In an example, the current parameter may include one or more of the following current parameters: a bus current between the battery pack P1 and the inverter P2, and a phase current between each energy storage module and a corresponding bridge arm.

When the current parameter includes the bus current between the battery pack P1 and the inverter P2, the current sensor may be disposed on a connection line between the battery pack P1 and the inverter P2. Specifically, when the positive electrode of the battery pack P1 is also connected with a main positive switch, the current sensor may be disposed on the connection line between the main positive switch and the inverter P2. For example, referring to FIG. 7, the current sensor H1 is provided between the positive electrode of the battery pack P1 and the inverter P2.

When the battery pack P1 includes a phase current between each energy storage module and a corresponding bridge arm, the current sensor may be disposed between the other end of the energy storage module and the connection point of the upper bridge arm and the lower bridge arm of the bridge arm corresponding to the energy storage module. For example, referring to FIG. 7, the current sensor H2 is disposed between the left end of the U-phase stator inductor L1 and the connection point of the upper bridge arm and the lower bridge arm of the U-phase arm. In another example, continuing to refer to FIG. 7, the current sensor H3 is disposed between the left end of the V-phase stator inductor L2 and the connection point of the upper bridge arm and the lower bridge arm of the V-phase arm. In yet another example, continuing to refer to FIG. 7, the current sensor H4 is disposed between the left end of the W-phase stator inductor L3 and the connection point of the upper bridge arm and the lower bridge arm of the W-phase arm.

The calculation module may be configured to calculate, when the current parameter of the battery pack heating system exceeds a preset expected current threshold interval, an expected duration of the on-off cycle and an expected ratio of the duration of the ON state to the charge-discharge cycle based on the preset expected current threshold interval.

The processing module may be further configured to adjust the on-off cycle based on the expected duration of the on-off cycle and the expected ratio.

In some embodiments, the calculation module may calculate an effective current value corresponding to the current parameter according to the current parameter, and determine whether the calculated effective current value exceeds the preset expected current threshold interval. When the effective current value needs to be adjusted because it is too large or too small, the effective current value of the battery pack heating system can be adjusted to fall within the preset expected current threshold interval by adjusting the ratio D of the duration of the ON state to the charge-discharge cycle and the on-off frequency f according to the relationship among the effective current value I, the ratio D of the duration of the ON state to the charge-discharge cycle and the on-off frequency f as illustrated by formula (3).

By adjusting the ratio of the duration of the ON state to the charge-discharge cycle and the on-off frequency, fine control of the battery pack heating system can be performed, so as to realize the variable speed heating and thus improve the heating efficiency.

FIG. 8 is a flow chart of a switch control method for a battery pack heating system according to an embodiment of the application. The control method may be applied to the switch control device shown in FIG. 4 to FIG. 7. As shown in FIG. 8, the switch control method 800 for the battery pack heating system may include steps S801 and S802.

At S801, when it is determined that a switch control cycle switches from a previous cycle to a current cycle, a target upper bridge arm switch module for the current cycle may be selected from upper bridge arm switch modules other than a target upper bridge arm switch module for the previous cycle in three-phase bridge arms, and/or a target lower bridge arm switch module for the current cycle may be selected from lower bridge arm switch modules other than a target lower bridge arm switch module for the previous cycle in the three-phase bridge arms.

At S802, during each switch control cycle, the target upper bridge arm switch module and the target lower bridge arm switch module may be controlled to be turned on and off, so as to control at least two phase energy storage modules in a motor of the battery pack heating system to store and release energy and thus realize heating of a battery pack.

The three-phase bridge arms are located in an inverter of the battery pack heating system, and the target upper bridge arm switch module and the target lower bridge arm switch module for a same switch control cycle are located in different phase bridge arms.

In some embodiments of the application, step S802 may further includes: controlling, during each switch control cycle, the target upper bridge arm switch module and the target lower bridge arm switch module to be periodically turned on and off according to an on-off cycle.

In some embodiments of the application, the switch control method 800 for the battery pack heating system further includes:

acquiring a temperature of a first target bridge arm and a temperature of a second target bridge arm;

selecting a new target upper bridge arm switch module from switch modules of bridge arms other than the first target bridge arm among the three-phase bridge arms when the temperature of the first target bridge arm exceeds a preset safety temperature threshold interval; and selecting a new target lower bridge arm switch module from switch modules of bridge arms other than the second target bridge arm among the three-phase bridge arms when the temperature of the second target bridge arm exceeds the safety temperature threshold interval;

wherein the first target bridge arm is a bridge arm of the three-phase bridge arms where the target upper bridge arm switch module is located, and the second target bridge arm is a bridge arm of the three-phase bridge arms where the target lower bridge arm switch module is located.

In some embodiments of the application, the switch control method 800 for the battery pack heating system further includes:

selecting, when the acquired temperature of the first target bridge arm exceeds the preset safety temperature threshold interval, a lower bridge arm switch module of a bridge arm other than the first target bridge arm and the second target bridge arm among the three-phase bridge arms as the new target lower bridge arm switch module.

In some embodiments of the application, the switch control method 800 for the battery pack heating system further includes:

selecting, when the acquired temperature of the second target bridge arm exceeds the preset safety temperature threshold interval, an upper bridge arm switch module of a bridge arm other than the first target bridge arm and the second target bridge arm among the three-phase bridge arms as the new target upper bridge arm switch module.

In some embodiments of the application, the switch control method 800 for the battery pack heating system further includes:

acquiring a temperature of a first energy storage module corresponding to a first target bridge arm and a temperature of a second energy storage module corresponding to a second target bridge arm;

selecting, when the temperature of the first energy storage module exceeds a preset safety temperature threshold interval, anew target upper bridge arm switch module from switch modules of bridge arms other than the first target bridge arm among the three-phase bridge arms; and selecting, when the temperature of the second energy storage module exceeds the safety temperature threshold interval, anew target lower bridge arm switch module from switch modules of bridge arms other than the second target bridge arm among the three-phase bridge arms;

wherein the first target bridge arm is abridge arm of the three-phase bridge arms where the target upper bridge arm switch module is located, and the second target bridge arm is a bridge arm of the three-phase bridge arms where the target lower bridge arm switch module is located.

In some embodiments of the application, the switch control method 800 for the battery pack heating system further includes:

selecting, when the acquired temperature of the first energy storage module exceeds the preset safety temperature threshold interval, a lower bridge arm switch module of a bridge arm other than the first target bridge arm and the second target bridge arm among the three-phase bridge arms as the new target lower bridge arm switch module.

In some embodiments of the application, the switch control method 800 for the battery pack heating system further includes:

selecting, when the acquired temperature of the second energy storage module exceeds the preset safety temperature threshold interval, an upper bridge arm switch module of a bridge arm other than the first target bridge arm and the second target bridge arm among the three-phase bridge arms as the new target upper bridge arm switch module.

In some embodiments of the application, the switch control method 800 for the battery pack heating system further includes:

selecting, when an acquired temperature of a first target bridge arm and an acquired temperature of a first energy storage module corresponding to the first target bridge arm exceed a preset safety temperature threshold interval, an upper bridge arm switch module of a second target bridge arm as a new target upper bridge arm switch module and selecting a lower bridge arm switch module of a bridge arm other than the first target bridge arm and the second target bridge arm among the three-phase bridge arms as a new target lower bridge arm switch module;

wherein the first target bridge arm is abridge arm of the three-phase bridge arms where the target upper bridge arm switch module is located, and the second target bridge arm is a bridge arm of the three-phase bridge arms where the target lower bridge arm switch module is located.

In some embodiments of the application, the switch control method 800 for the battery pack heating system further includes:

selecting, when an acquired temperature of a second target bridge arm and an acquired temperature of a second energy storage module corresponding to the second target bridge arm exceed a preset safety temperature threshold interval, a lower bridge arm switch module of a first target bridge arm as a new target lower bridge arm switch module and selecting an upper bridge arm switch module of a bridge arm other than the first target bridge arm and the second target bridge arm among the three-phase bridge arms as a new target upper bridge arm switch module;

wherein the first target bridge arm is abridge arm of the three-phase bridge arms where the target upper bridge arm switch module is located, and the second target bridge arm is a bridge arm of the three-phase bridge arms where the target lower bridge arm switch module is located.

In some embodiments of the application, the switch control method 800 for the battery pack heating system further includes:

controlling all switch modules of the three-phase bridge arms to be in an OFF state when both an acquired temperature of a first target bridge arm and an acquired temperature of a second target bridge arm exceed a preset safety temperature threshold interval; or controlling all switch modules of the three-phase bridge arms to be in an OFF state when both an acquired temperature of a first energy storage module corresponding to the first target bridge arm and an acquired temperature of a second energy storage module corresponding to the second target bridge arm exceed a preset safety temperature threshold interval; or controlling all switch modules of the three-phase bridge arms to be in an OFF state when both the acquired temperature of the first target bridge arm and the acquired temperature of the second energy storage module exceed a preset safety temperature threshold interval or when both the acquired temperature of the second target bridge arm and the acquired temperature of the first energy storage module exceed a preset safety temperature threshold interval, wherein the first target bridge arm is a bridge arm of the three-phase bridge arms where the target upper bridge arm switch module is located, and the second target bridge arm is a bridge arm of the three-phase bridge arms where the target lower bridge arm switch module is located.

In some embodiments of the application, the switch control method 800 for the battery pack heating system further includes:

acquiring, after a preset time period, the temperature of the first target bridge arm and the temperature of the second target bridge arm and reselecting the target upper bridge arm switch module and the target lower bridge arm switch module based on the temperature of the first target bridge arm and the temperature of the second target bridge arm; or acquiring, after a preset time period, the temperature of the first energy storage module and the temperature of the second energy storage module and reselecting the target upper bridge arm switch module and the target lower bridge arm switch module based on the temperature of the first energy storage module and the temperature of the second energy storage module; or acquiring, after a preset time period, the temperature of the first target bridge arm, the temperature of the second target bridge arm, the temperature of the first energy storage module and the temperature of the second energy storage module and reselecting the target upper bridge arm switch module and the target lower bridge arm switch module based on the temperature of the first target bridge arm, the temperature of the second target bridge arm, the temperature of the first energy storage module and the temperature of the second energy storage module.

In some embodiments of the application, the switch control method 800 for the battery pack heating system further includes:

reporting over-temperature fault information of the battery pack heating system to a vehicle controller when the acquired temperature of the first target bridge arm and the acquired temperature of the second target bridge arm exceed a corresponding maximum tolerable temperature; or reporting the over-temperature fault information of the battery pack heating system to the vehicle controller when the acquired temperature of the first energy storage module and the acquired temperature of the second energy storage module exceed a corresponding maximum tolerable temperature; or reporting the over-temperature fault information of the battery pack heating system to the vehicle controller when the acquired temperature of the first target bridge arm and the acquired temperature of the second energy storage module exceed a corresponding maximum tolerable temperature or when the acquired temperature of the second target bridge arm and the acquired temperature of the first energy storage module exceed a corresponding maximum tolerable temperature.

In some embodiments of the application, the switch control method 800 for the battery pack heating system further includes:

controlling all switch modules of the three-phase bridge arms to be in an OFF state in response to a stop-heating instruction sent by a battery management module, wherein the stop-heating instruction indicates that a state parameter of the battery pack meets a preset stop-heating condition, when the state parameter includes a temperature, the preset stop-heating condition includes the temperature being greater than or equal to an expected temperature threshold, and when the state parameter includes a state of charge, the preset stop-heating condition includes the state of charge being less than or equal to an allowable state of charge threshold for heating.

In some embodiments of the application, the switch control method 800 for the battery pack heating system further includes:

acquiring a current parameter of the battery pack heating system;

calculating, when the current parameter of the battery pack heating system exceeds a preset expected current threshold interval, an expected duration of the on-off cycle and an expected ratio of the duration of the ON state to the charge-discharge cycle based on the preset expected current threshold interval;

adjusting the on-off cycle based on the duration of the expected on-off cycle and the expected ratio;

wherein the current parameter of the battery pack heating system includes one or more of the following current parameters: a bus current between the battery pack and the inverter, and a phase current between each energy storage module and a corresponding bridge arm.

It should be noted that for the related description of the switch control method in the embodiments of the present application, reference may be made to the related content of the above switch control device, and details are not described herein again.

An embodiment of the application also provides a motor controller. The motor controller may include the switch control device of the battery pack heating system provided by the embodiments of the present application.

For the related description of the switch control device of the battery pack heating system in the motor controller in the embodiment, reference may be made to the related description of the foregoing embodiments of the present application, and details are not described herein again.

In some examples, the motor controller in the embodiment may perform the switch control method for the battery pack heating system in the above embodiments. For the related description of the switch control method for the battery pack heating system, reference may be made to the related content of the foregoing embodiments of the present application, and details are not described herein again.

In some embodiments of the application, in order to control various switch modules, the motor controller may be coupled to the various switch modules in the inverter P2, but the connection relationship is not shown in FIG. 1. Specifically, the connection relationship may be a wired connection or a wireless communication connection, which is not limited herein.

An embodiment of the present application further provides a battery pack heating control system. Referring to FIG. 4, the battery pack heating control system may include: the battery pack heating system and the switch control device P5 of the battery pack heating system provided by the embodiments of the present application.

The battery pack heating system includes the inverter P2 connected to the battery pack P1 and the motor P3 connected to the inverter P2.

It should be noted that for the related description of the battery pack heating system in the battery pack heating control system and the switch control device of the battery pack heating system in the embodiment, reference can be made to the related description of the above embodiments of the present application, and details are not described herein again.

In some embodiments of the present application, each phase bridge arm of the three-phase bridge arm includes an upper bridge arm and a lower bridge arm, the upper bridge arm is provided with a switch module, the lower bridge arm is provided with a switch module, and the switch module includes a diode.

For the switch module of the upper bridge arm, an anode of the diode is connected to a connection point of the upper bridge arm and the lower bridge arm, and a cathode of the diode is located between the upper bridge arm and the positive electrode of the battery pack P1. For the switch module of the lower bridge arm, an anode of the diode is located between the lower bridge arm and the negative electrode of the battery pack P1, and a cathode of the diode is connected to the connection point of the upper bridge arm and the lower bridge arm.

As an example, referring to FIG. 1 to FIG. 3, each switch module includes a diode. For the switch modules of the upper bridge arm, such as P21, P23 and P25, the anode of the diode is connected to the connection point of the upper bridge arm and the lower bridge arm, and the cathode of the diode is located between the upper bridge arm and the positive electrode of the battery pack.

In some embodiments of the application, the switch module may include one or more of an insulated gate bipolar transistor IGBT chip, an IGBT module, and a metal-oxide semiconductor field effect transistor MOSFET.

It should be noted that for the related description of the switch module, reference may be made to the related description of the foregoing embodiments of the present application, and details are not described herein again.

It is to be understood that various embodiments in the specification are described in a progressive manner, and the same or similar parts between the various embodiments may be referred to each other, and each embodiment focuses on the difference from other embodiments. The method embodiments are described in a relatively simple manner. For related content, refer to the description of the system embodiments. The application is not limited to the specific steps and structures described above and illustrated in the drawings. A person skilled in the art can make various changes, modifications and additions or change the order between the steps, with the understanding of the spirit of the application. Also, a detailed description of known method techniques is omitted herein for the sake of conciseness.

The functional modules (such as the energy storage module, the switch module, the parameter acquisition module, the processing module, the fault reporting module, the current parameter acquisition module, the calculation module, and the signal adjustment module) in the above embodiments may be implemented as hardware, software, firmware, or a combination thereof. When implemented in hardware, the functional modules may be, for example, an electronic circuit, an application specific integrated circuit (ASIC), suitable firmware, plug-in, a function card, and the like. When implemented in software, the elements of the application may be programs or code segments that are used to perform required tasks. The programs or code segments can be stored in a machine readable medium or transmitted over a transmission medium or a communication link via a data signal carried in a carrier. A "machine readable medium" may include any medium that can store or transfer information.

What is claimed is:

1. A switch control device for a battery pack heating system, wherein the switch control device comprises:
   a processing module configured to:
   when it is determined that a switch control cycle switches from a previous cycle to a current cycle, select a target upper bridge arm switch module for the current cycle from upper bridge arm switch modules other than a target upper bridge arm switch module for the previous cycle, and select a target lower bridge arm switch module for the current cycle from lower bridge arm switch modules other than a target lower bridge arm switch module for the previous cycle;
   wherein the processing module is further configured to:
   during each switch control cycle, control the target upper bridge arm switch module and the target lower bridge arm switch module to be turned on and off, so as to control at least two energy storage modules in a motor of the battery pack heating system to store and release energy and thus realize heating of a battery pack;
   wherein the battery pack heating system comprises an inverter, and the target upper bridge arm switch module and the target lower bridge arm switch module for a same switch control cycle are located in different phase bridge arms in the inverter.

2. The switch control device of claim 1, wherein the processing module is further configured to:
   during each switch control cycle, control the target upper bridge arm switch module and the target lower bridge arm switch module to be periodically turned on and off according to an on-off cycle.

3. The switch control device of claim 1, wherein:
   the processing module is further configured to select a new target upper bridge arm switch module from switch modules of bridge arms other than a first target bridge arm when a temperature of the first target bridge arm exceeds a preset safety temperature threshold interval; and
   the processing module is further configured to select a new target lower bridge arm switch module from switch modules of bridge arms other than a second target bridge arm when a temperature of the second target bridge arm exceeds the preset safety temperature threshold interval;
   wherein the temperature of the first target bridge arm or the temperature of the second target bridge arm is acquired by a first parameter acquisition module,
   the first target bridge arm is a bridge arm where the target upper bridge arm switch module is located, and the second target bridge arm is a bridge arm where the target lower bridge arm switch module is located.

4. The switch control device of claim 3, wherein the processing module is further configured to:
when the acquired temperature of the first target bridge arm exceeds the preset safety temperature threshold interval, select a lower bridge arm switch module of a bridge arm other than the first target bridge arm and the second target bridge as the new target lower bridge arm switch module.

5. The switch control device of claim 3, wherein the processing module is further configured to:
when the acquired temperature of the second target bridge arm exceeds the preset safety temperature threshold interval, select an upper bridge arm switch module of a bridge arm other than the first target bridge arm and the second target bridge arm as the new target upper bridge arm switch module.

6. The switch control device of claim 1, wherein:
the processing module is further configured to select a new target upper bridge arm switch module from switch modules of bridge arms other than a first target bridge arm when a temperature of a first energy storage module corresponding to the first target bridge arm exceeds a preset safety temperature threshold interval; and
the processing module is further configured to select a new target lower bridge arm switch module from switch modules of bridge arms other than a second target bridge arm when a temperature of a second energy storage module corresponding to the second target bridge arm exceeds the preset safety temperature threshold interval;
wherein the temperature of the first energy storage module or the temperature of the second energy storage module is acquired by a second parameter acquisition module,
the first target bridge arm is a bridge arm where the target upper bridge arm switch module is located, and the second target bridge arm is a bridge arm where the target lower bridge arm switch module is located.

7. The switch control device of claim 6, wherein the processing module is further configured to:
when the acquired temperature of the first energy storage module exceeds the preset safety temperature threshold interval, select a lower bridge arm switch module of a bridge arm other than the first target bridge arm and the second target bridge arm as the new target lower bridge arm switch module.

8. The switch control device of claim 6, wherein the processing module is further configured to:
when the acquired temperature of the second energy storage module exceeds the preset safety temperature threshold interval, select an upper bridge arm switch module of a bridge arm other than the first target bridge arm and the second target bridge arm as the new target upper bridge arm switch module.

9. The switch control device of claim 1, wherein the processing module is further configured to:
when an acquired temperature of a first target bridge arm and an acquired temperature of a first energy storage module corresponding to the first target bridge arm exceed a preset safety temperature threshold interval, select an upper bridge arm switch module of a second target bridge arm as a new target upper bridge arm switch module, and select a lower bridge arm switch module of a bridge arm other than the first target bridge arm and the second target bridge arm as a new target lower bridge arm switch module;
wherein the first target bridge arm is a bridge arm where the target upper bridge arm switch module is located, and the second target bridge arm is a bridge arm where the target lower bridge arm switch module is located.

10. The switch control device of claim 1, wherein the processing module is further configured to:
when an acquired temperature of a second target bridge arm and an acquired temperature of a second energy storage module corresponding to the second target bridge arm exceed a preset safety temperature threshold interval, select a lower bridge arm switch module of a first target bridge arm as a new target lower bridge arm switch module, and select an upper bridge arm switch module of a bridge arm other than the first target bridge arm and the second target bridge arm as a new target upper bridge arm switch module;
wherein the first target bridge arm is a bridge arm where the target upper bridge arm switch module is located, and the second target bridge arm is a bridge arm where the target lower bridge arm switch module is located.

11. The switch control device of claim 1, wherein:
the processing module is further configured to:
when both an acquired temperature of a first target bridge arm and an acquired temperature of a second target bridge arm exceed a preset safety temperature threshold interval, control all switch modules of the inverter to be in an OFF state; or
the processing module is further configured to:
when both an acquired temperature of a first energy storage module corresponding to the first target bridge arm and an acquired temperature of a second energy storage module corresponding to the second target bridge arm exceed a preset safety temperature threshold interval, control all switch modules of the inverter to be in an OFF state; or
the processing module is further configured to:
when both the acquired temperature of the first target bridge arm and the acquired temperature of the second energy storage module exceed a preset safety temperature threshold interval or when both the acquired temperature of the second target bridge arm and the acquired temperature of the first energy storage module exceed a preset safety temperature threshold interval, control all switch modules of the inverter to be in an OFF state,
wherein the first target bridge arm is a bridge arm where the target upper bridge arm switch module is located, and the second target bridge arm is a bridge arm where the target lower bridge arm switch module is located.

12. The switch control device of claim 11, wherein after all the switch modules of the inverter are controlled to be in the OFF state,
the processing module is further configured to: after a preset time period, acquire the temperature of the first target bridge arm and the temperature of the second target bridge arm, and reselect the target upper bridge arm switch module and the target lower bridge arm switch module based on the temperature of the first target bridge arm and the temperature of the second target bridge arm; or
the processing module is further configured to: after a preset time period, acquire the temperature of the first energy storage module and the temperature of the second energy storage module, and reselect the target upper bridge arm switch module and the target lower bridge arm switch module based on the temperature of the first energy storage module and the temperature of the second energy storage module; or the processing module is further configured to: after a preset time period, acquire the temperature of the first target bridge arm, the temperature of the second target bridge arm, the temperature of the first energy storage module and the temperature of the second energy storage module, and reselect the target upper bridge arm switch module and the target lower bridge arm switch module based on the temperature of the first target bridge arm, the temperature of the second target bridge arm, the temperature of the first energy storage module and the temperature of the second energy storage module.

13. The switch control device of claim 1, further comprising a fault reporting module, wherein:

the fault reporting module is configured to report over-temperature fault information of the battery pack heating system to a vehicle controller when an acquired temperature of a first target bridge arm and an acquired temperature of a second target bridge arm exceed a corresponding maximum tolerable temperature; or the fault reporting module is configured to report the over-temperature fault information of the battery pack heating system to the vehicle controller when an acquired temperature of a first energy storage module and an acquired temperature of a second energy storage module exceed a corresponding maximum tolerable temperature; or the fault reporting module is configured to report the over-temperature fault information of the battery pack heating system to the vehicle controller when the acquired temperature of the first target bridge arm and the acquired temperature of the second energy storage module exceed a corresponding maximum tolerable temperature or when the acquired temperature of the second target bridge arm and the acquired temperature of the first energy storage module exceed a corresponding maximum tolerable temperature.

14. The switch control device of claim 1, wherein the processing module is further configured to control all switch modules of the inverter to be in an OFF state in response to a stop-heating instruction sent by a battery management module, wherein the stop-heating instruction indicates that a state parameter of the battery pack meets a preset stop-heating condition, when the state parameter includes a temperature, the preset stop-heating condition includes the temperature being greater than or equal to an expected temperature threshold, and when the state parameter includes a state of charge, the preset stop-heating condition includes the state of charge being less than or equal to an allowable state of charge threshold for heating.

15. The switch control device of claim 2, further comprising:

a current parameter acquisition module configured to acquire a current parameter of the battery pack heating system;

a calculation module configured to calculate, when the current parameter of the battery pack heating system exceeds a preset expected current threshold interval, an expected duration of the on-off cycle and an expected ratio of a duration of an ON state to a charge-discharge cycle based on the preset expected current threshold interval;

wherein the processing module is further configured to adjust the on-off cycle based on the expected duration of the on-off cycle and the expected ratio;

wherein the current parameter of the battery pack heating system includes one or more of the following current parameters: a bus current between the battery pack and the inverter, and a phase current between each energy storage module and a corresponding bridge arm.

16. A switch control method for a battery pack heating system, comprising:

selecting, when it is determined that a switch control cycle switches from a previous cycle to a current cycle, a target upper bridge arm switch module for the current cycle from upper bridge arm switch modules other than a target upper bridge arm switch module for the previous cycle, and selecting a target lower bridge arm switch module for the current cycle from lower bridge arm switch modules other than a target lower bridge arm switch module for the previous cycle; and controlling, during each switch control cycle, the target upper bridge arm switch module and the target lower bridge arm switch module to be turned on and off, so as to control at least two energy storage modules in a motor of the battery pack heating system to store and release energy and thus realize heating of a battery pack;

wherein the battery pack heating system comprises an inverter, and the target upper bridge arm switch module and the target lower bridge arm switch module for a same switch control cycle are located in different phase bridge arms in the inverter.

17. A motor controller comprising the switch control device for the battery pack heating system according to claim 1.

18. A battery pack heating control system, comprising: a battery pack heating system, and the switch control device for the battery pack heating system according to claim 1;

wherein the battery pack heating system includes the inverter connected to the battery pack and the motor connected to the inverter.

19. The battery pack heating control system according to claim 18, wherein each bridge arm includes an upper bridge arm and a lower bridge arm, the upper bridge arm is provided with a switch module, the lower bridge arm is provided with a switch module, and the switch module includes a diode;

for the switch module of the upper bridge arm, an anode of the diode is connected to a connection point of the upper bridge arm and the lower bridge arm, and a cathode of the diode is located between the upper bridge arm and a positive electrode of the battery pack;

for the switch module of the lower bridge arm, an anode of the diode is located between the lower bridge arm and a negative electrode of the battery pack, and a cathode of the diode is connected to the connection point of the upper bridge arm and the lower bridge arm.

20. The battery pack heating control system of claim 19, wherein the switch module comprises one or more of an insulated gate bipolar transistor IGBT chip, an IGBT module, a metal-oxide semiconductor field effect transistor MOSFET.

* * * * *